United States Patent
Manolakos et al.

(10) Patent No.: US 10,177,826 B2
(45) Date of Patent: Jan. 8, 2019

(54) TRANSMISSION OF CHANNEL STATE INFORMATION BASED ON SELECTED NON-FREQUENCY DOMAIN COMPONENTS OF CHANNEL RESPONSES

(71) Applicant: QUALCOMM Incorporated, San Diego, CA (US)

(72) Inventors: Alexandros Manolakos, San Diego, CA (US); Jing Jiang, San Diego, CA (US); June Namgoong, San Diego, CA (US); Raghuraman Krishnamoorthi, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 15/176,986

(22) Filed: Jun. 8, 2016

(65) Prior Publication Data
US 2017/0187441 A1     Jun. 29, 2017

Related U.S. Application Data

(60) Provisional application No. 62/271,559, filed on Dec. 28, 2015.

(51) Int. Cl.
*H04B 7/06*     (2006.01)
*H04L 5/00*     (2006.01)
(Continued)

(52) U.S. Cl.
CPC ......... *H04B 7/0626* (2013.01); *H04B 7/0663* (2013.01); *H04L 5/0048* (2013.01);
(Continued)

(58) Field of Classification Search
CPC ............... H04L 45/28; H04L 41/0654; H04L 2012/5627; H04L 47/10; H04L 2012/5631; H04L 47/15; H04L 47/2441; H04L 47/70
(Continued)

(56) References Cited

U.S. PATENT DOCUMENTS 6,473,467 B1 * 10/2002 Wallace ............... H04B 7/0417
370/208
8,428,163 B2     4/2013 Kent et al.
(Continued)

FOREIGN PATENT DOCUMENTS

WO     WO-2011146606 A1     11/2011

OTHER PUBLICATIONS

ISA/EP, International Search Report and Written Opinion of the International Searching Authority, Int'l Application No. PCT/US2016/067319, dated Aug. 10, 2017, European Patent Office, Rijswijk, NL, 24 pgs.

(Continued)

*Primary Examiner* — Brenda H Pham
(74) *Attorney, Agent, or Firm* — Holland & Hart LLP

(57) ABSTRACT

Techniques are described for wireless communication. One method includes identifying a plurality of channel responses corresponding to a plurality of channels. Each channel of the plurality of channels corresponds to a pairing of a transmit antenna with a receive antenna. Each channel response of the plurality of channel responses corresponds to a plurality of tone subsets. The method also includes selecting, for each channel of the plurality of channels, a subset of non-frequency domain components of the channel response for the channel, and transmitting, for at least one channel of the plurality of channels, at least one subset of channel state information (CSI). The at least one subset of CSI is based at (Continued)

least in part on at least one of the selected subsets of non-frequency domain components.

24 Claims, 14 Drawing Sheets

(51) Int. Cl.
*H04W 72/04* (2009.01)
*H04L 25/02* (2006.01)

(52) U.S. Cl.
CPC ........ *H04L 25/022* (2013.01); *H04L 25/0204* (2013.01); *H04L 25/0212* (2013.01); *H04L 25/0216* (2013.01); *H04L 25/0218* (2013.01); *H04W 72/0413* (2013.01)

(58) Field of Classification Search
USPC ....... 370/216, 230, 229, 232, 235, 241, 252, 370/253, 310.2, 328, 338, 332, 333, 334
See application file for complete search history.

(56) References Cited

U.S. PATENT DOCUMENTS

| | | | |
|---|---|---|---|
| 8,761,283 B2* | 6/2014 | Ponnampalam | H04B 7/0626 370/208 |
| 9,148,803 B2 | 9/2015 | Cheng | |
| 2005/0069047 A1 | 3/2005 | Suzuki | |
| 2005/0267715 A1 | 12/2005 | Kolu et al. | |
| 2008/0008258 A1 | 1/2008 | Tanabe | |
| 2008/0031375 A1 | 2/2008 | Zhou et al. | |
| 2013/0201912 A1* | 8/2013 | Sheng | H04B 7/0413 370/328 |

OTHER PUBLICATIONS

ISA/EPO, Partial International Search Report of the International Searching Authority, Int'l. App. No. PCT/US2016/067319, dated Mar. 23, 2017, European Patent Office, Rijswijk, NL, 10 pgs.

* cited by examiner

TRANSMISSION OF CHANNEL STATE INFORMATION BASED ON SELECTED NON-FREQUENCY DOMAIN COMPONENTS OF CHANNEL RESPONSES

CROSS REFERENCES

The present application for patent claims priority to U.S. Provisional Patent Application No. 62/271,559 by Manolakos, et al., entitled "Transmission of Channel State Information Based on Selected Non-Frequency Domain Components of Channel Responses," filed Dec. 28, 2015, assigned to the assignee hereof.

BACKGROUND

Field of the Disclosure

The present disclosure, for example, relates to wireless communication systems, and more particularly to techniques for transmitting channel state information (CSI) based on selected non-frequency domain components of channel responses.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of smart radio heads (radio heads (RHs)) in communication with a number of access node controllers (ANCs), where a set of one or more radio heads, in communication with an ANC, defines an eNB. A base station or radio head may communicate with a set of UEs on downlink channels (e.g., for transmissions from a base station or radio head to a UE) and uplink channels (e.g., for transmissions from a UE to a base station or radio head).

Some wireless communication systems may use beamforming and/or multiple input/multiple output (MIMO) beamforming to communicate between a network access device (e.g., an eNB, an ANC, a radio head, or a base station) and a number of UEs. Prior to configuring a precoding matrix for a plurality of channels (e.g., a plurality of downlink channels), a network access device may estimate the plurality of channels. In some examples, the channel estimation may be achieved using reciprocal channel estimation (e.g., estimation of a corresponding plurality of uplink channels). However, in some examples, reciprocal channel estimation may not be possible. In these examples, channel estimation may be based on CSI received from a UE. In extreme bandwidth wireless communication systems (e.g., in next generation or 5G networks), the transmission of a full set of CSI for a plurality of channels may consume significant resources (e.g., bandwidth).

SUMMARY

The present disclosure, for example, relates to techniques for transmitting CSI based on selected non-frequency domain components (e.g., time domain components) of channel responses. In many scenarios, the channel response of a wideband channel is sparse (e.g., has few main components) in the time domain. By selecting a subset of time domain components of a channel response (e.g., one or more main components), and transmitting CSI to a network access device based at least in part on the selected subset of time domain components, the resources needed to transmit the CSI can sometimes be reduced. When a selected subset of time domain components of a channel response for a channel is sufficiently representative of the time domain components of the channel response, a network access device that receives CSI based at least in part on the selected subset of time domain components may be able to estimate the channel sufficiently to provide a high beamforming gain and/or meet other target goals.

In one example, a method for wireless communication is described. The method may include identifying a plurality of channel responses corresponding to a plurality of channels. Each channel of the plurality of channels may correspond to a pairing of a transmit antenna with a receive antenna, and each channel response of the plurality of channel responses may correspond to a plurality of tone subsets. The method may also include selecting, for each channel of the plurality of channels, a subset of non-frequency domain components of the channel response for the channel, and transmitting, for at least one channel of the plurality of channels, at least one subset of CSI. The at least one subset of CSI may be based at least in part on at least one of the selected subsets of non-frequency domain components.

In some examples of the method, the method may include transforming each channel response of the plurality of channel responses from a frequency domain to a time domain, and selecting a subset of non-frequency domain components of a channel response for a channel may include selecting a subset of time domain components of the channel response. In some examples, the method may include transforming each channel response of the plurality of channel responses from a frequency domain to a time domain, and determining an average of the channel responses in the time domain, and selecting a subset of non-frequency domain components of a channel response for a channel may include selecting a subset of time domain components from the average of the channel responses. In some examples, the subset of time domain components of a channel response for a channel may be selected based at least in part on: a sparseness restriction, or a fixed number of time domain components, or a normalized power threshold, or a relative distance between time domain components, or a persistence of a time domain component across more than one subframe, or a presence of a time domain component in a group of channel responses corresponding to a particular combination of tone and receive antenna, or a delay spread compression target, or a beamforming gain target, or a combination thereof.

In some examples, the method may include receiving a plurality of reference signals over the plurality of channels, and measuring the plurality of reference signals, and the plurality of channel responses may be identified based at least in part on measurements of the plurality of reference signals. In some examples, a non-frequency domain component of a channel response for a channel may be identified by a location, a phase, an amplitude, or a combination thereof, and the method may include quantizing the location, the phase, the amplitude, or a combination thereof, and identifying the at least one subset of CSI for the at least one channel based at least in part on the quantized location, the quantized phase, the quantized amplitude, or the quantized combination thereof. In some examples, a location or a phase corresponding to a non-frequency domain component of a channel response for a channel may be quantized with more bits than an amplitude corresponding to the non-frequency domain component of the channel response. In some examples, quantizing the location, the phase, the amplitude, or the combination thereof may include selecting at least one index into a codebook of quantized locations, quantized phases, or quantized amplitudes, and transmitting the at least one subset of CSI for the at least one channel may include transmitting the at least one selected index into the codebook.

In some examples of the method, transmitting the at least one subset of CSI for the at least one channel of the plurality of channels may include transmitting a first subset of CSI for at least a first channel during a first subframe, and transmitting a second subset of CSI for at least a second channel during a second subframe. In some examples, transmitting the at least one subset of CSI for the at least one channel of the plurality of channels may include transmitting a first subset of CSI for at least a first channel during a first subframe, and transmitting a supplement to the first subset of CSI for at least the first channel during a second subframe, the second subframe transmitted later in time than the first subframe. In some examples, the first subset of CSI transmitted during the first subframe may include at least a first location, a first phase, a first amplitude, or a combination thereof identifying a first non-frequency domain component of the first channel. In some examples, the supplement to the first subset of CSI transmitted during the second subframe may include at least a second location, a second phase, a second amplitude, or a combination thereof identifying a second non-frequency domain component of the first channel. In some examples, the supplement to the first subset of CSI transmitted during the second subframe may include at least a second location relative to the first location, a second phase relative to the first phase, a second amplitude relative to the first amplitude, or a combination thereof identifying a second non-frequency domain component of the first channel.

In some examples of the method, transmitting the at least one subset of CSI for the at least one channel of the plurality of channels may include transmitting a single subset of CSI, and the single subset of CSI may be associated with each channel of the plurality of channels. In some examples, the tone subsets may be from a group consisting of single tone subsets and tone bundles.

In one example, an apparatus for wireless communication is described. The apparatus may include means for identifying a plurality of channel responses corresponding to a plurality of channels. Each channel of the plurality of channels may correspond to a pairing of a transmit antenna with a receive antenna, and each channel response of the plurality of channel responses may correspond to a plurality of tone subsets. The apparatus may also include means for selecting, for each channel of the plurality of channels, a subset of non-frequency domain components of the channel response for the channel, and means for transmitting, for at least one channel of the plurality of channels, at least one subset of CSI. The at least one subset of CSI may be based at least in part on at least one of the selected subsets of non-frequency domain components.

In some examples, the apparatus may include means for transforming each channel response of the plurality of channel responses from a frequency domain to a time domain, and the means for selecting a subset of non-frequency domain components of a channel response for a channel may include means for selecting a subset of time domain components of the channel response. In some examples, the apparatus may include means for transforming each channel response of the plurality of channel responses from a frequency domain to a time domain, and means for determining an average of the channel responses in the time domain, and the means for selecting a subset of non-frequency domain components of a channel response for a channel may include means for selecting a subset of time domain components from the average of the channel responses. In some examples, the subset of time domain components of a channel response for a channel may be selected based at least in part on: a sparseness restriction, or a fixed number of time domain components, or a normalized power threshold, or a relative distance between time domain components, or a persistence of a time domain component across more than one subframe, or a presence of a time domain component in a group of channel responses corresponding to a particular combination of tone and receive antenna, or a delay spread compression target, or a beamforming gain target, or a combination thereof.

In some examples, the apparatus may include means for receiving a plurality of reference signals over the plurality of channels, and means for measuring the plurality of reference signals, and the plurality of channel responses may be identified based at least in part on measurements of the plurality of reference signals. In some examples, a non-frequency domain component of a channel response for a channel may be identified by a location, a phase, an amplitude, or a combination thereof, and the apparatus may include means for quantizing the location, the phase, the amplitude, or a combination thereof, and means for identifying the at least one subset of CSI for the at least one channel based at least in part on the quantized location, the quantized phase, the quantized amplitude, or the quantized combination thereof. In some examples, a location or a phase corresponding to a non-frequency domain component of a channel response for a channel may be quantized with more bits than an amplitude corresponding to the non-frequency domain component of the channel response. In some examples, the means for quantizing the location, the phase, the amplitude, or the combination thereof may include means for selecting at least one index into a codebook of quantized locations, quantized phases, or quantized amplitudes, and the means for transmitting the at least one subset of CSI for the at least one channel may include means for transmitting the at least one selected index into the codebook.

In some examples of the apparatus, the means for transmitting the at least one subset of CSI for the at least one channel of the plurality of channels may include means for transmitting a first subset of CSI for at least a first channel during a first subframe, and means for transmitting a second subset of CSI for at least a second channel during a second subframe. In some examples, the means for transmitting the at least one subset of CSI for the at least one channel of the plurality of channels may include means for transmitting a first subset of CSI for at least a first channel during a first subframe, and means for transmitting a supplement to the first subset of CSI for at least the first channel during a second subframe, the second subframe transmitted later in time than the first subframe. In some examples, the first subset of CSI transmitted during the first subframe may include at least a first location, a first phase, a first amplitude, or a combination thereof identifying a first non-frequency domain component of the first channel. In some examples, the supplement to the first subset of CSI transmitted during the second subframe may include at least a second location, a second phase, a second amplitude, or a combination thereof identifying a second non-frequency domain component of the first channel. In some examples, the supplement to the first subset of CSI transmitted during the second subframe may include at least a second location relative to the first location, a second phase relative to the first phase, a second amplitude relative to the first amplitude, or a combination thereof identifying a second non-frequency domain component of the first channel.

In some examples of the apparatus, the means for transmitting the at least one subset of CSI for the at least one channel of the plurality of channels may include means for transmitting a single subset of CSI. The single subset of CSI may be associated with each channel of the plurality of channels. In some examples, the tone subsets may be from a group consisting of single tone subsets and tone bundles.

In one example, another apparatus for wireless communication is described. The apparatus may include a channel response identifier to identify a plurality of channel responses corresponding to a plurality of channels. Each channel of the plurality of channels may correspond to a pairing of a transmit antenna with a receive antenna, and each channel response of the plurality of channel responses may correspond to a plurality of tone subsets. The apparatus may also include a channel response parser to select, for each channel of the plurality of channels, a subset of non-frequency domain components of the channel response for the channel, and a CSI transmission manager to transmit, for at least one channel of the plurality of channels, at least one subset of CSI. The at least one subset of CSI may be based at least in part on at least one of the selected subsets of non-frequency domain components.

In some examples of the apparatus, the channel response parser may transform each channel response of the plurality of channel responses from a frequency domain to a time domain, and may select a subset of non-frequency domain components of a channel response for a channel by selecting a subset of time domain components of the channel response. In some examples, the channel response parser may transform each channel response of the plurality of channel responses from a frequency domain to a time domain, determine an average of the channel responses in the time domain, and select a subset of non-frequency domain components of a channel response for a channel by selecting a subset of time domain components from the average of the channel responses. In some examples, the subset of time domain components of a channel response for a channel may be selected based at least in part on a sparseness restriction, or a fixed number of time domain components, or a normalized power threshold, or a relative distance between time domain components, or a persistence of a time domain component across more than one subframe, or a presence of a time domain component in a group of channel responses corresponding to a particular combination of tone and receive antenna, or a delay spread compression target, or a beamforming gain target, or a combination thereof.

In some examples of the apparatus, a non-frequency domain component of a channel response for a channel may be identified by a location, a phase, an amplitude, or a combination thereof, and the apparatus may include a quantizer to quantize the location, the phase, the amplitude, or a combination thereof, and a CSI identifier to identify the at least one subset of CSI for the at least one channel based at least in part on the quantized location, the quantized phase, the quantized amplitude, or the quantized combination thereof. In some examples, transmitting the at least one subset of CSI for the at least one channel of the plurality of channels may include transmitting a first subset of CSI for at least a first channel during a first subframe, and transmitting a second subset of CSI for at least a second channel during a second subframe. In some examples, transmitting the at least one subset of CSI for the at least one channel of the plurality of channels may include transmitting a first subset of CSI for at least a first channel during a first subframe, and transmitting a supplement to the first subset of CSI for at least the first channel during a second subframe. The second subframe may be transmitted later in time than the first subframe. In some examples, transmitting the at least one subset of CSI for the at least one channel of the plurality of channels may include transmitting a single subset of CSI, where the single subset of CSI is associated with each channel of the plurality of channels.

In one example, a non-transitory computer-readable medium storing computer-executable code for wireless communication is described. The code may be executable by a processor to identify a plurality of channel responses corresponding to a plurality of channels. Each channel of the plurality of channels may correspond to a pairing of a transmit antenna with a receive antenna, and each channel response of the plurality of channel responses may correspond to a plurality of tone subsets. The code may also be executable by the processor to select, for each channel of the plurality of channels, a subset of non-frequency domain components of the channel response for the channel, and to transmit, for at least one channel of the plurality of channels, at least one subset of CSI. The at least one subset of CSI may be based at least in part on at least one of the selected subsets of non-frequency domain components.

In some examples of the non-transitory computer-readable medium, the code may be executable by the processor to transform each channel response of the plurality of channel responses from a frequency domain to a time domain, and the code executable by the processor to select a subset of non-frequency domain components of a channel response for a channel may include code executable by the processor to select a subset of time domain components of the channel response. In some examples, the code may be executable by the processor to transform each channel response of the plurality of channel responses from a frequency domain to a time domain, and to determine an average of the channel responses in the time domain; and the code executable by the processor to select a subset of non-frequency domain components of a channel response for a channel may include code executable by the processor to select a subset of time domain components from the average of the channel responses. In some examples, the subset of time domain components of a channel response for a channel may be selected based at least in part on a sparseness restriction, or a fixed number of time domain components, or a normalized power threshold, or a relative distance between time domain components, or a persistence of a time domain component across more than one subframe, or a presence of a time domain component in a group of channel responses corresponding to a particular combination of tone and receive antenna, or a delay spread compression target, or a beamforming gain target, or a combination thereof.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
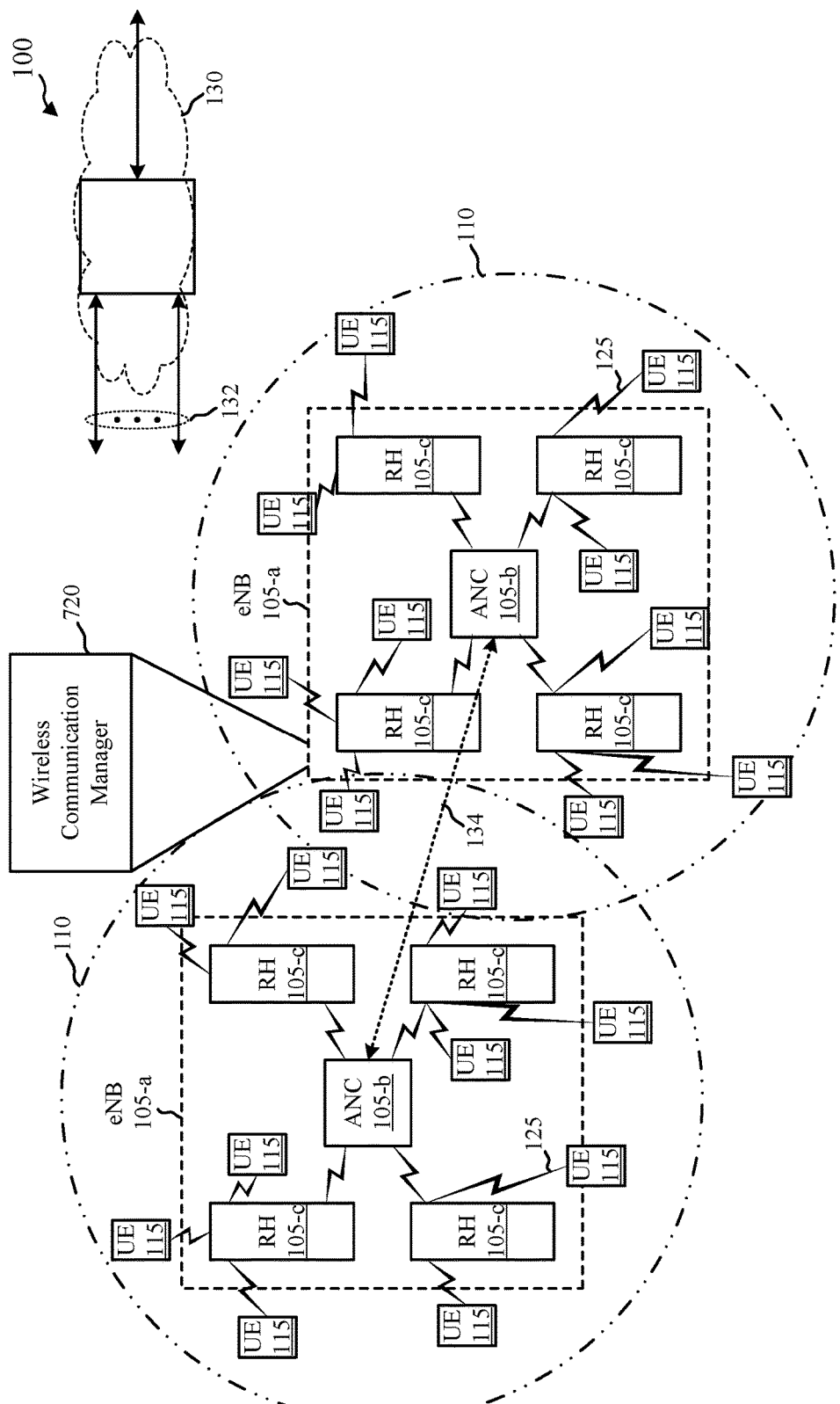
FIG. 1 illustrates an example of a wireless communication system, in accordance with various aspects of the disclosure.

Techniques are described in which CSI is transmitted based on selected non-frequency domain components (e.g., time domain components) of channel responses. Effective downlink beamforming can be an important aspect of an extreme bandwidth wireless communication system (e.g., a next generation or 5G network), and particularly so in a massive MIMO scenario. High carrier frequencies may require high beamforming gains close to a link. Effective beamforming can only occur using a closed-loop MIMO technique. However, in some wireless communication systems, reciprocal channel estimation is not possible (e.g., in Frequency Division Duplexing (FDD)-based systems, or in Time Division Duplexing (TDD)-based systems in which Sounding Reference Signal (SRS) estimation is not possible). For these and other types of wireless communication system, CSI feedback from a UE to a network access device may be needed. In some examples, a UE may estimate a channel for each of a plurality of tones (or tone bundles) over which the channel is transmitted and feed back either an index from a codebook of possible precoders or quantized information of the channel's frequency response for each tone (or tone bundle). In an extreme bandwidth wireless communication system (e.g., in a next generation or 5G network), the transmission of this information for a plurality of channels may consume significant resources (e.g., bandwidth). On the other hand, if not enough CSI is fed back, a network access device may not be able to provide effective beamforming (or may provide less effective beamforming). The techniques described in the present disclosure can reduce the quantity of CSI fed back to a network access device yet enable the network access device to provide effective beamforming.

In many scenarios, the channel response of a wideband channel is sparse (e.g., has few main components) in the time domain. By selecting a subset of time domain components of a channel response (e.g., one or more main components), and transmitting CSI to a network access device based at least in part on the selected subset of time domain components, the resources needed to transmit the CSI can sometimes be reduced. When a selected subset of time domain components of a channel response for a channel is sufficiently representative of the time domain components of the channel response, a network access device that receives CSI based at least in part on the selected subset of time domain components may be able to estimate the channel sufficiently to provide a high beamforming gain and/or meet other target goals.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples.

FIG. 1 illustrates an example of a wireless communication system 100, in accordance with various aspects of the disclosure. The wireless communication system 100 may include network access devices 105, UEs 115, and a core network 130. The core network 130 may provide user authentication, access authorization, tracking, Internet Protocol (IP) connectivity, and other access, routing, or mobility functions. At least some of the network access devices 105 (e.g., eNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart radio heads (radio heads (RHs)) 105-c. In an alternative configuration of the wireless communication system 100, the functionality of an ANC 105-b may be provided by a radio head 105-c or distributed across the radio heads 105-c of an eNB 105-a. In another alternative configuration of the wireless communication system 100, the radio heads 105-c may be replaced with base stations, and the ANCs 105—may be replaced by base station controllers (or links to the core network 130).

The ANCs 105-b may wirelessly communicate with the UEs 115 via one or more radio heads 105-c, with each radio head 105-c having one or more antennas. Each of the radio heads 105-c may provide communication coverage for a respective geographic coverage area 110, and may provide one or more remote transceivers associated with an ANC 105-b. A radio head 105-c may perform many of the functions of a LTE/LTE-A base station. In some examples, an ANC 105-b may be implemented in distributed form, with a portion of the ANC 105-b being provided in each radio head 105-c. The geographic coverage area 110 for a radio head 105-c may be divided into sectors making up only a portion of the coverage area (not shown). In some examples, the network access devices 105 may be replaced with alternative network access devices, such as base transceiver stations, radio base stations, access points, radio transceivers, NodeBs, eNodeBs (eNBs), Home NodeBs, Home eNodeBs, etc. The wireless communication system 100 may include radio heads 105-c (or base stations or other network access devices) of different types (e.g., macro cell and/or small cell network access devices). The geographic coverage areas 110 of the radio heads 105-c or other network access devices may overlap. In some examples, different eNBs 105-a may be associated with different radio access technologies.

In some examples, the wireless communication system 100 may include a 5G network. In other examples, the wireless communication system 100 may include a LTE/LTE-A network. The wireless communication system 100 may in some cases be a heterogeneous network, in which different types of eNBs provide coverage for various geographical regions. For example, each eNB 105-a or radio head 105-c may provide communication coverage for a macro cell, a small cell, and/or other types of cell. The term "cell" is a 3GPP term that can be used to describe a base station, a radio head, a carrier or component carrier associated with a base station or a radio head, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-a and/or radio heads 105-c may have similar frame timing, and transmissions from different eNBs 105-a and/or radio heads 105-c may be approximately aligned in time. For asynchronous operation, the eNBs 105-a and/or radio heads 105-c may have different frame timings, and transmissions from different eNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL)

station, an Internet of Everything (IoE) device, or other electronic device having a wireless communication interface. A UE may be able to communicate with various types of eNBs 105-a, radio heads 105-c, base stations, access points, or other network access devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include uplink (UL) channels from a UE 115 to a radio head 105-c, and/or downlink (DL) channels, from a radio head 105-c to a UE 115. The downlink channels may also be called forward link channels, while the uplink channels may also be called reverse link channels.

One or more of the UEs 115 may include a wireless communication manager 720. In some examples, the wireless communication manager 720 may be used to identifying a plurality of channel responses corresponding to a plurality of channels between a UE 115 and a network access device 105. Each channel of the plurality of channels may correspond to a pairing of a transmit antenna of the network access device 105 with a receive antenna of the UE 115. Each channel response of the plurality of channel responses may correspond to a plurality of tone subsets. The wireless communication manager 720 may also be used to select, for each channel of the plurality of channels, a subset of non-frequency domain components of the channel response for the channel, and to transmit, for at least one channel of the plurality of channels, at least one subset of channel state information (CSI). The at least one subset of CSI may be based at least in part on at least one of the selected subsets of non-frequency domain components.

Each communication link 125 may include one or more carriers, where each carrier may be a signal made up of multiple sub-carriers or tones (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using FDD techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, the radio heads 105-c and/or UEs 115 may include multiple antennas for employing antenna diversity schemes to improve communication quality and reliability between radio heads 105-c and UEs 115. Additionally or alternatively, radio heads 105-c and/or UEs 115 may employ MIMO techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
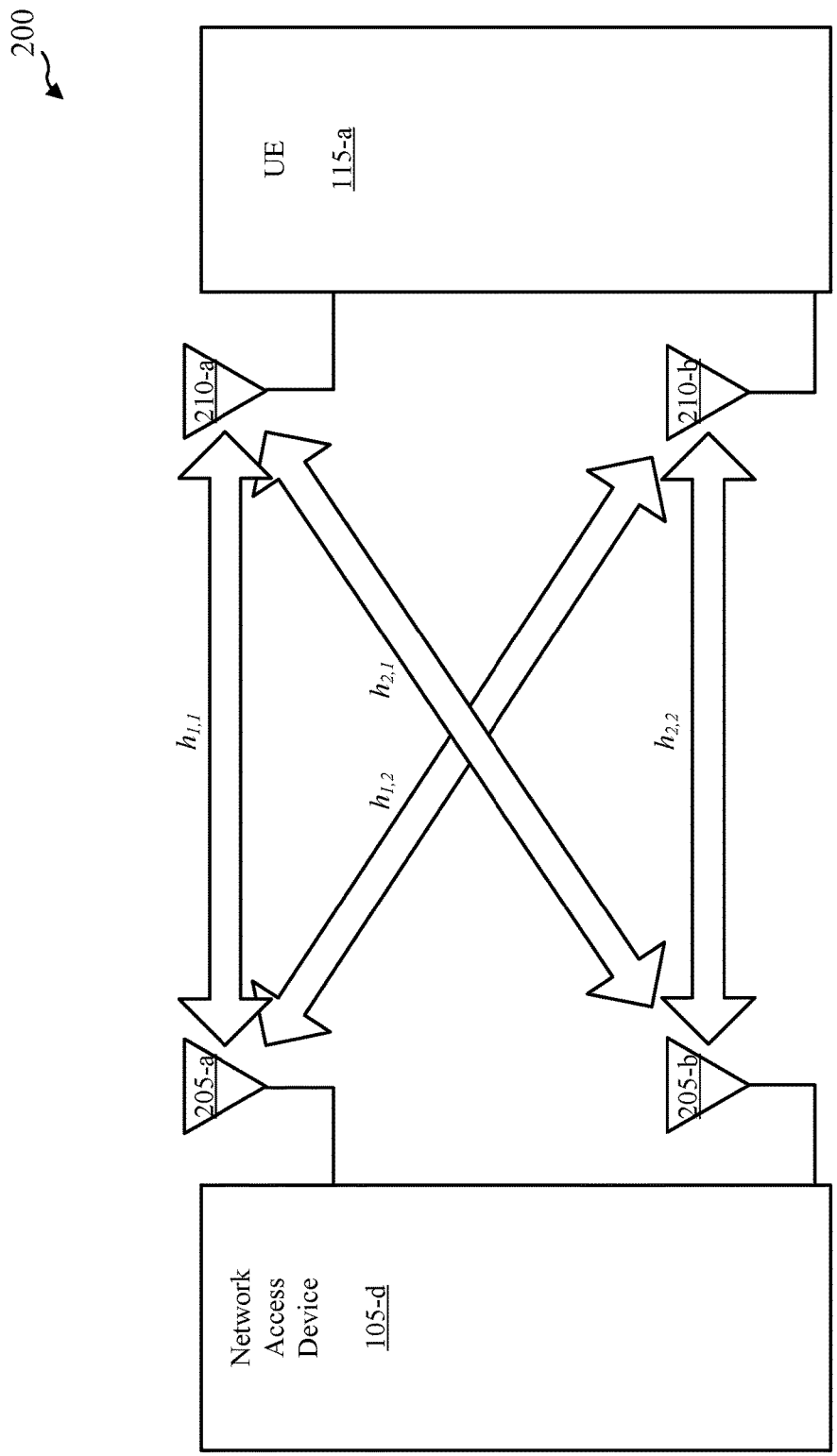
FIG. 2 illustrates an example of a wireless communication system in which downlink beamforming may be used, in accordance with various aspects of the disclosure.

FIG. 2 illustrates an example of a wireless communication system 200 in which downlink beamforming may be used, in accordance with various aspects of the disclosure. The wireless communication system 200 includes a network access device 105-d and a UE 115-a, which may be respective examples of the network access devices 105 and UEs 115 described with reference to FIG. 1. The network access device 105-d may be, for example, an eNB, an ANC, a radio head, or a base station.

In the example wireless communication system 200, the number of transmit antennas of the network access device 105-d is two (including a first transmit antenna 205-a and a second transmit antenna 205-b), the number of receive antennas of the UE 115-a is two (including a first receive antenna 210-a and a second receive antenna 210-b), and the number of transmit streams to be spatially multiplexed on the transmit antennas 205 and received by the receive antennas 210 is two (including a first transmit stream, $x_1^k$ and a second transmit stream, $x_2^k$) at some tone (or tone subset) k. Symbols from the two transmit streams may be matrix multiplied by a precoder matrix at this tone, $P_k$; transmitted from the transmit antennas 205 to the receive antennas 210 over a plurality of channels (e.g., channels $h_{1,2}$, $h_{2,2}$, $h_{2,1}$, and $h_{2,2}$); and received at the UE 115-a as received streams $y_1^k$, and $y_2^k$. The precoding matrices $\{P_k\}$ may be different per tone subset. In some examples, the tone subsets may include single tone subsets. In some examples, the tone subsets may include tone bundles (with each tone bundling including a plurality of tones).

The vector of received streams in every tone, $$y_k = \begin{bmatrix} y_1^k \\ y_2^k \end{bmatrix},$$

can be expressed as follows:

$$\begin{bmatrix} y_1^k \\ y_2^k \end{bmatrix} = H_k \cdot P_k \cdot \begin{bmatrix} x_1^k \\ x_2^k \end{bmatrix} + n_k$$

where $n_k$ represents the received noise and interference vector at the UE 105-a at tone k. The two-by-two precoder matrix, $P_k$, may express the way in which transmitted symbols are multiplexed before transmission from the transmit antennas 205, and $H_k$ is the two-by-two matrix that contains the values of the four channels $h_{1,2}$, $h_{2,2}$, $h_{2,1}$, and $h_{2,2}$ for tone k.

In alternative configurations of the wireless communication system 200, the network access device 105-d may have more or fewer transmit antennas 205 and may transmit more or fewer transmit streams. Similarly, the UE 115-a may have more or fewer receive antennas 210 and may receive more or fewer received streams. The number of transmit antennas may be less than, equal to, or greater than the number of receive antennas. In some examples, the wireless communication system 200 may include a plurality of UEs, and the network access device 105-d may transmit different transmit streams to different UEs, using the same or different transmit antennas. The set of precoding matrices, $\{P_k\}$, may be used to provide downlink beamforming for the transmit streams.

Figure 3:
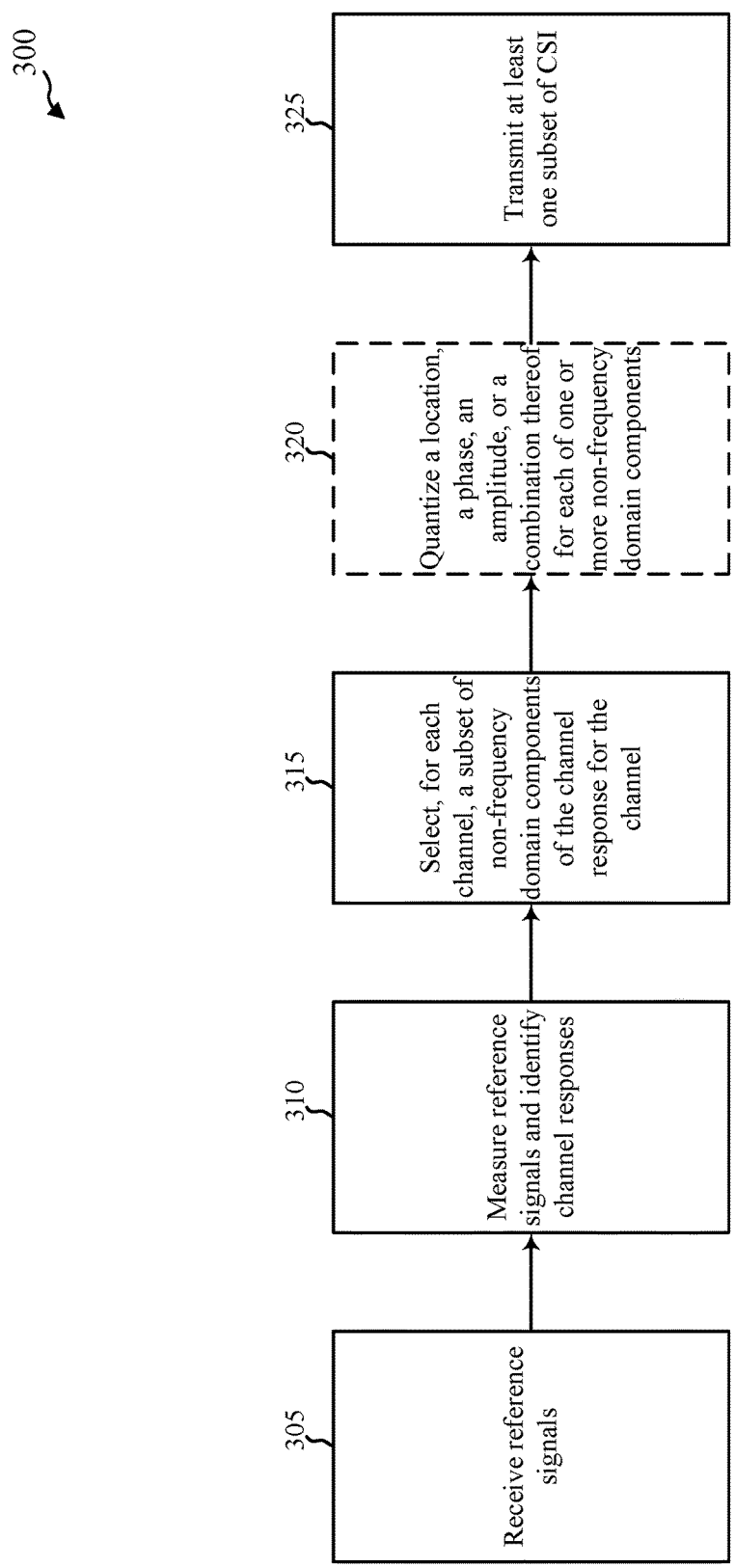
FIG. 3 shows a process flow for wireless communication, in accordance with various aspects of the present disclosure.

FIG. 3 shows a process flow 300 for wireless communication, in accordance with various aspects of the present disclosure. The process flow 300 may be performed by a UE, such as one of the UEs 115 described with reference to FIG. 1 or 2.

At block 305, the UE may receive a plurality of reference signals over a plurality of channels. Each channel of the plurality of channels may correspond to a pairing of a transmit antenna (of a network access device) with a receive antenna (e.g., of the UE).

At block 310, the UE may measure the plurality of reference signals and identify, based at least in part on the measurements, a plurality of channel responses corresponding to the plurality of channels. Each of the channel responses may be represented by a channel frequency response across a plurality of tone subsets. In some examples, the plurality of tone subsets may be dispersed across a bandwidth of the UE. In some examples, the plurality of tone subsets may include single tone subsets. In some examples, the plurality of tone subsets may include tone bundles.

At block 315, the UE may select, for each channel of the plurality of channels, a subset of non-frequency domain components (e.g., one or more paths or multipaths) of the channel response for the channel. In some examples, a non-frequency domain component of a channel response for a channel may be identified by a location, a phase, an amplitude, or a combination thereof. In some examples, a subset of non-frequency domain components may include a subset of time domain components. In some examples, the selection of a subset of non-frequency domain components of a channel response can be considered a "pruning" of the channel response.

At block 320, the UE may optionally quantize a location, a phase, an amplitude, or a combination thereof of a non-frequency domain component of a channel response for a channel. In some examples, a location or a phase corresponding to a non-frequency domain component of the channel response for a channel may be quantized with more bits than an amplitude corresponding to the non-frequency domain component of the channel response. In some examples, quantizing a location, a phase, an amplitude, or a combination thereof may include selecting at least one index into a codebook of quantized locations, quantized phases, or quantized amplitudes.

At block 325, the UE may transmit at least one subset of CSI. The at least one subset of CSI may correspond to at least one channel of the plurality of channels, and may be based at least in part on at least one of the selected subsets of non-frequency domain components. In some examples, the at least one subset of CSI may consist of a single subset of CSI, which single subset of CSI is associated with each channel of the plurality of channels. In some examples, the at least one subset of CSI may include different subsets of CSI associated with the same or different channels. The at least one subset of CSI may be transmitted to a network access device.

Further details of the operations performed at blocks 305, 310, 315, 320, and 325 are described with reference to FIGS. 4A, 4B, 5, and 6.

Figure 4A:
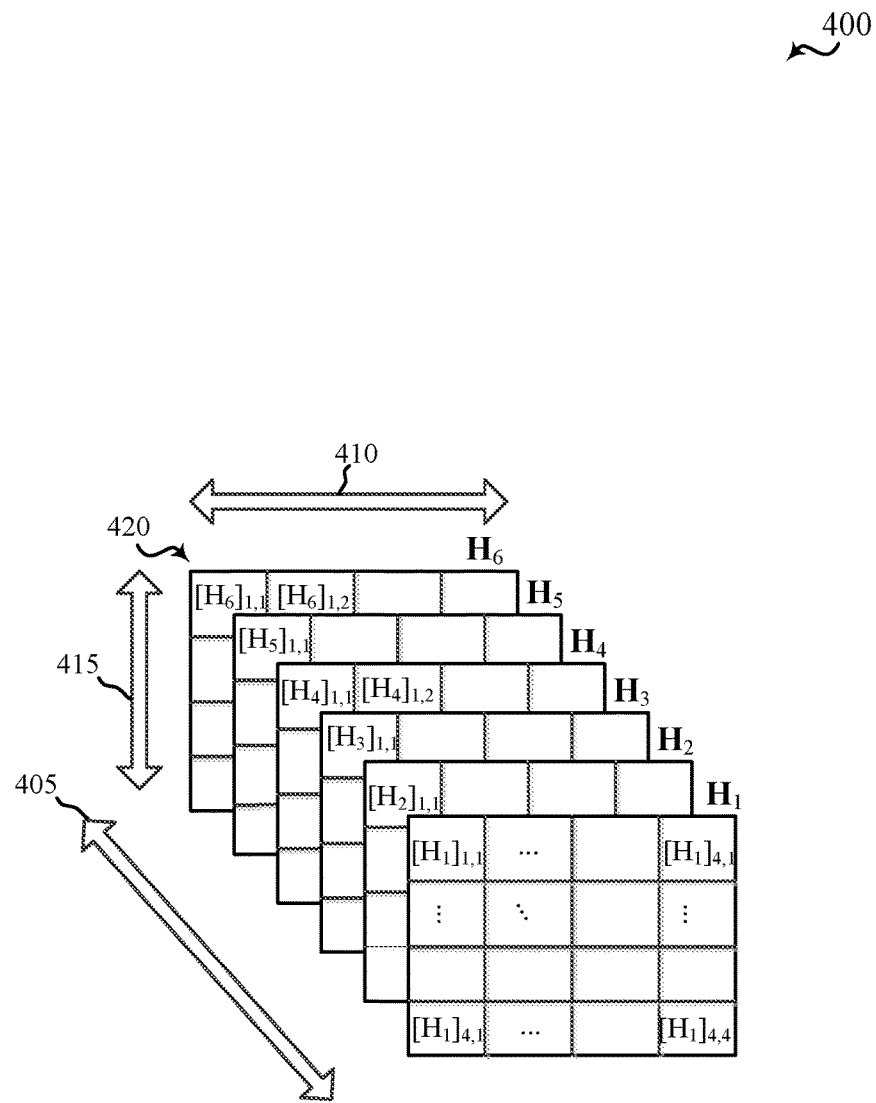
FIG. 4A shows an example of an array of channel estimates, in accordance with various aspects of the present disclosure.

FIG. 4A shows an example of an array of channel estimates 400, in accordance with various aspects of the present disclosure. The array of channel estimates 400 may be identified (e.g., determined) by a UE, such as one of the UEs 115 described with reference to FIG. 1 or 2.

By way of example, the array of channel estimates 400 is shown to have a first dimension 405 defined by a number (N) of tone subsets (e.g., 6 tone subsets). In some examples, the plurality of tone subsets may include single tone subsets. In some examples, the plurality of tone subsets may include tone bundles. In some examples, the plurality of tone subsets may be dispersed across a bandwidth (BW) of a UE that identifies the channel estimates 400. By way of further example, the array of channel estimates 400 is shown to have a second dimension 410 defined by a number of transmit antennas ($N_T$, e.g., 4 transmit antennas) of a network access device, and a third dimension 415 defined by a number of receive antennas ($N_R$, e.g., 4 receive antennas) of a UE. A plurality of channels are defined by the intersections of columns (in the second dimension 410) and rows (in the third dimension 415) of the array of channel estimates 400, where the columns correspond to the transmit antennas and the rows correspond to the receive antennas. For each channel, a set of channel estimates $[H_k]_{i,j}$ may be identified, where k is the kth tone subset in the first dimension 405, i is the ith transmit antenna in the second dimension 410, and j is the jth transmit antenna in the third dimension 415. An array of channel estimates associated with a tone subset is designated $H_k$.

In some examples, a UE may receive and measure at least one reference signal received over at least one of the plurality of channels, and determine at least one of the channel estimates, $[H_k]_{i,j}$, for at least one of the plurality of channels based at least in part on the measurement(s). The reference signal(s) may be transmitted by a network access device.

In some examples, just some of the channel estimates, $[H_k]_{i,j}$, may be identified. In some examples, at least one channel estimate may be identified based at least in part on at least one other channel estimate. In some examples, at least one channel estimate may be identified based at least in part on an average of a set of channel estimates.

A channel response is defined as a subset of channel estimates corresponding to a pairing of a transmit antenna with a receive antenna, across the plurality of tone subsets. For example, a first channel response 420 may include the channel estimates $[H_1]_{1,1}$, $[H_2]_{1,1}$, $[H_3]_{1,1}$, $[H_4]_{1,1}$, $[H_5]_{1,1}$, and $[H_6]_{1,1}$.

When the tone subsets include tone bundles, a channel estimate $[H_k]_{i,j}$ may be a channel estimate that corresponds to each of a plurality of adjacent tones in a tone bundle (e.g., a channel estimate $[H_k]_{i,j}$ may be an average channel estimate for the tones of a tone bundle).

Figure 4B:
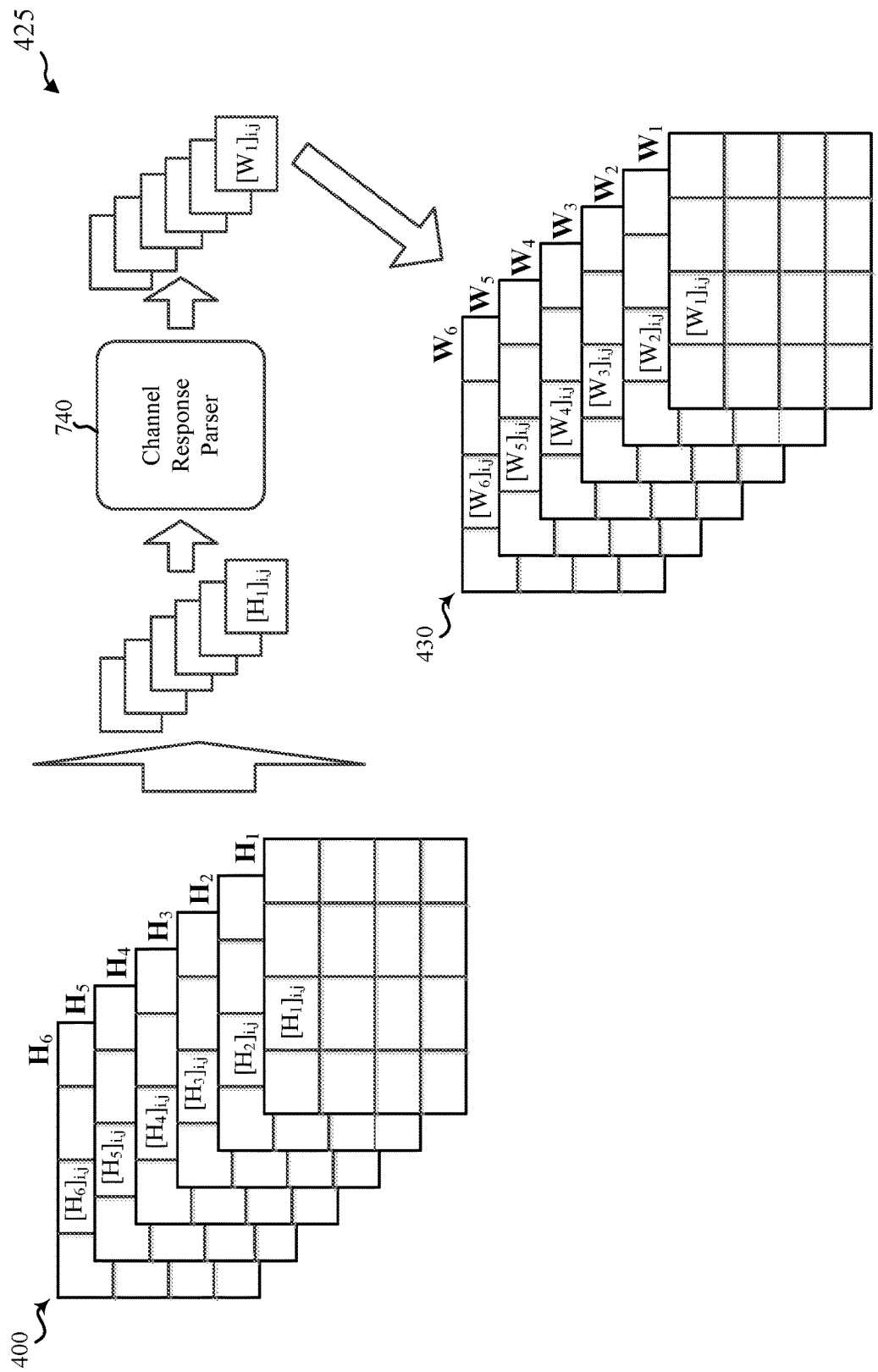
FIG. 4B shows an example process flow for selecting a subset of non-frequency domain components of a channel response for a channel, in accordance with various aspects of the present disclosure.

FIG. 4B shows an example process flow 425 for selecting a subset of non-frequency domain components of a channel response for a channel, in accordance with various aspects of the present disclosure. The process flow 425 may be performed by a UE, such as one of the UEs 115 described with reference to FIG. 1 or 2. The process flow 425 may receive, as an input, the array of channel estimates 400 described with reference to FIG. 4A.

The process flow 425 may be executed serially or in parallel for each channel frequency response (or vector) $h_{i,j}$, where $h_{i,j} = \{[H_1]_{i,j}; [H_2]_{i,j}; [H_3]_{i,j}; \ldots\}$. A channel response $h_{i,j}$ may be provided as input to a channel response parser 740. The channel response parser 740 may select and output, for each channel response, a subset of non-frequency domain components of the channel response. The subset of non-frequency domain components of a channel response is designated $w_{i,j} = \{[W_1]_{i,j}; [W_2]_{i,j}; [W_3]_{i,j}; \ldots\}$. Some of the values $[W_k]_{i,j}$ may be zero values. Each subset of non-frequency domain components output by the channel response parser 740 may be used to generate a modified array of channel estimates 430 (i.e., a modified version of the array of channel estimates 400, which modified version is based at least in part on the subsets of non-frequency domain components selected for each channel response input to the channel response parser 740). In some examples, the subsets of non-frequency domain components may be selected, by the channel response parser 740, to make each channel response of the modified array of channel estimates 430 more sparse in the non-frequency domain. In some examples, the non-frequency domain components selected by the channel response parser 740 may include time domain components. In some examples, each of the non-frequency domain components (or time domain components) may be represented by a location, a phase, an amplitude, or a combination thereof.

Figure 5:
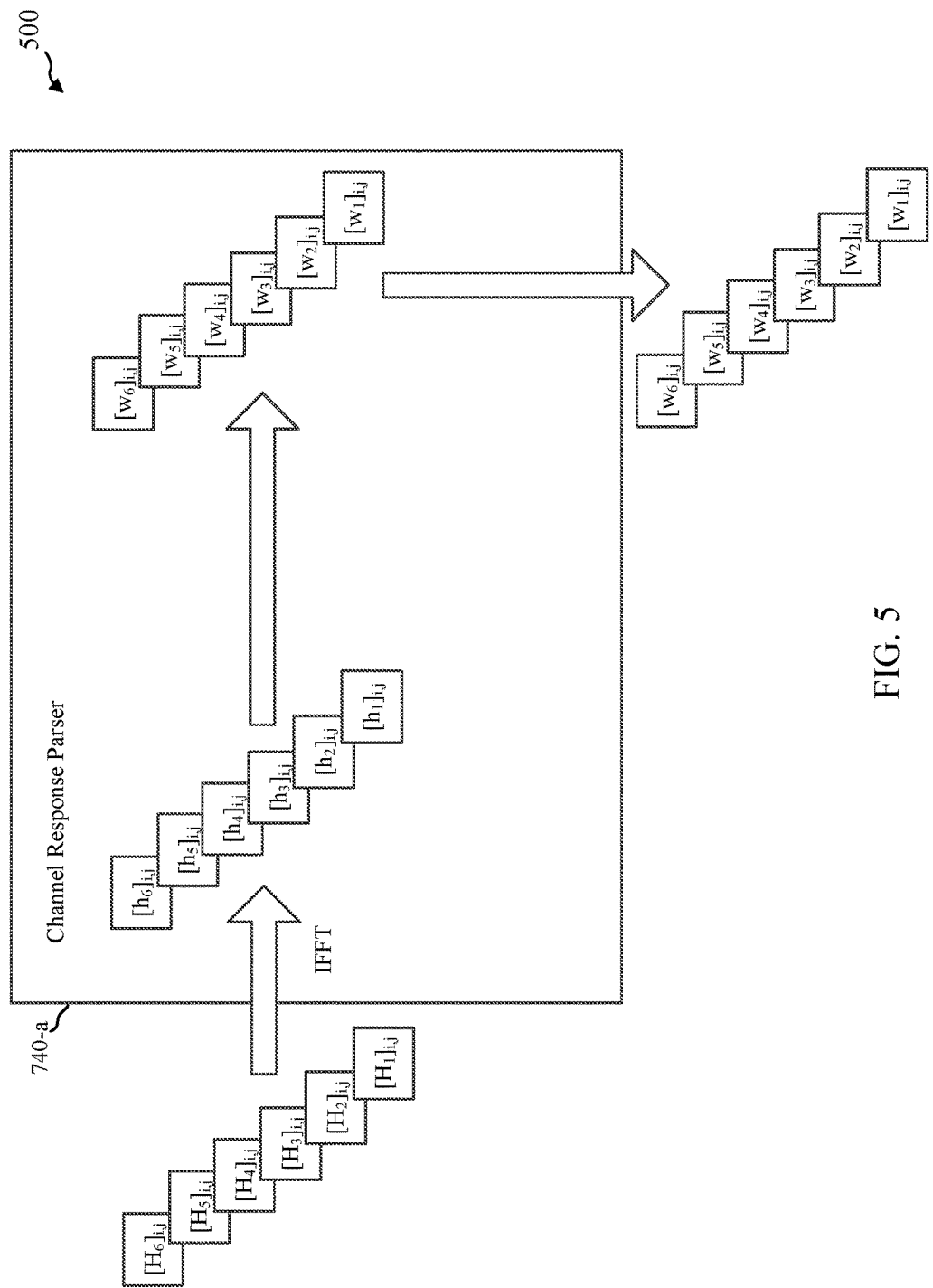
FIG. 5 shows an example process flow for selecting a subset of non-frequency domain components of a channel response, in accordance with various aspects of the present disclosure.

FIG. 5 shows an example process flow 500 for selecting a subset of non-frequency domain components of a channel response, in accordance with various aspects of the present disclosure. The process flow 500 may be performed by a UE, such as one of the UEs 115 described with reference to FIG. 1 or 2. In some examples, the process flow 500 may be performed by a channel response parser 740-*a*, which may be an example of the channel response parser 740 described with reference to FIG. 4B. The process flow 500 may receive, as an input, an array of channel estimates, such as the array of channel estimates 400 described with reference to FIG. 4A.

The process flow 500 may be executed serially or in parallel for each channel response (or vector) $h_{i,j}$, where $h_{i,j} = \{[H_1]_{i,j}; [H_3]_{i,j}; \ldots\}$. By way of example, FIG. 5 shows a channel response $h_{2,1}$ being provided as input to a channel response parser 740-*a*. The channel response parser 740-*a* may transform the channel response $h_{i,j}$ from the frequency domain to a time domain (e.g., by performing an Inverse Fast Fourier Transform (IFFT) on the channel response $h_{i,j}$). The channel response parser 740-*a* may then select, in the time domain and from the transformed channel response, $h_{i,j}'$ (where $h_{i,j}' = \{[h_1]_{i,j}; [h_2]_{i,j}; [h_3]_{i,j}; \ldots\}$), a subset of time domain components of the channel response. The subset of time domain components of the vector $h_{i,j}$ or $h_{i,j}'$ is designated $w_{s,i}' = \{[w_1]_{i,j}; [w_2]_{i,j}; [w_3]_{i,j}; \ldots\}$. Some of the values $[w_k]_{i,j}$ may be zero values. Other values $[w_k]_{i,j}$ may include a location component, a phase component, and an amplitude component, or a combination thereof.

In some examples, the subset of time domain components $w_{i,j}'$ of the channel response $h_{i,j}$ (or of the transformed channel response $h_{i,j}'$) may be selected based at least in part on a sparseness restriction (e.g., a restriction that causes the channel response $h_{i,j}$ to be smooth in the frequency domain.

In some examples, the subset of time domain components $w_{i,j}'$ of the channel response $h_{i,j}$ (or of the transformed channel response $h_{i,j}'$) may be selected based at least in part on a power threshold. For example, values of $h_{i,j}'$ exceeding a normalized power threshold (or values of $h_{i,j}'$ having the highest normalized powers) may be selected for inclusion in the subset of time domain components $w_{i,j}'$. Selecting the subset of time domain components based on a power threshold can enable a network access device receiving a subset of CSI based at least in part on the subset of time domain components to provide a high beamforming gain for one or more downlink channels.

In some examples, the subset of time domain components $w_{i,j}'$ of the channel response $h_{i,j}$ (or of the transformed channel response $h_{i,j}'$) may be selected based at least in part on a relative distance(s) between the selected time domain components. For example, a set of values of $h_{i,j}'$ that are more distant from one another (or less clustered) may be selected for inclusion in the subset of time domain components $w_{i,j}'$. Selecting the subset of time domain components based on the relative distance(s) between the time domain components can enable a network access device receiving a subset of CSI based at least in part on the subset of time domain components to provide beamforming robustness in the case of correlated paths.

In some examples, a time domain component $w_{i,j}'$ of the channel response $h_{i,j}$ (or of the transformed channel response $h_{i,j}'$) may be selected based at least in part on a persistence of the time domain component across more than one subframe.

In some examples, a time domain component $w_{i,j}'$ of the channel response $h_{i,j}$ (or of the transformed channel response $h_{i,j}'$) may be selected based at least in part on the presence of the time domain component in a group of channel responses (or all of the channel responses) corresponding to a particular combination of tone and receive antenna (i.e., the channel responses corresponding to a particular combination of tone and receive antenna across different transmit antennas). In these examples, a network access device receiving a subset of CSI based at least in part on the subset of time domain components may apply a same precoder to all of the tones. Also, only a phase (and not a location or amplitude) may be included in the subset of CSI transmitted to the network access device. This mode of operation may be referred to as a wideband beamforming mode of operation.

In some examples, the subset of time domain components $w_{i,j}'$ of the channel response $h_{i,j}$ (or of the transformed channel response $h_{i,j}'$) may be selected based at least in part on a delay spread compression target. For example, a set of values of $h_{i,j}'$ that provide an effective channel with maximum delay spread compression may be selected.

In some examples, the subset of time domain components $w_{i,j}'$ of the channel response $h_{i,j}$ (or of the transformed channel response $h_{i,j}'$) may be selected based at least in part on a beamforming gain target. For example, a subset of time domain components including enough values of $h_{i,j}'$ to enable a network access device to provide a target beamforming gain may be selected.

In some examples, a fixed number of time domain components (e.g., 3-5 time domain components) of the channel response $h_{i,j}$ (or of the transformed channel response $h_{i,j}'$) may be selected.

Figure 6:
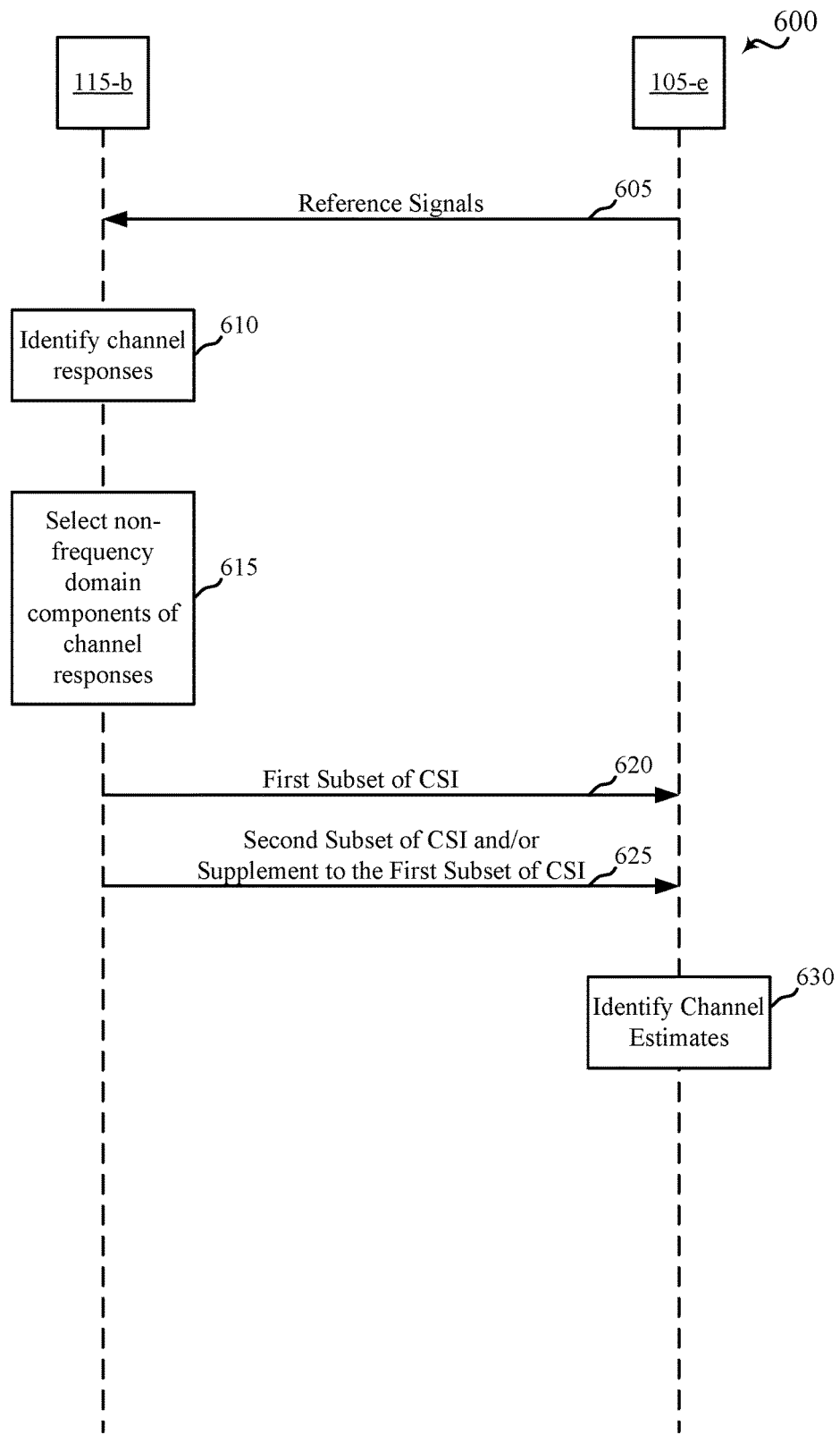
FIG. 6 shows a communication flow in which communication occurs between a network access device and a UE, in accordance with various aspects of the present disclosure.

FIG. 6 shows a communication flow 600 in which communication occurs between a network access device 105-*e* and a UE 115-*b*, in accordance with various aspects of the present disclosure. The network access device 105-*e* may be an example of aspects of one of the network access devices 105 described with reference to FIG. 1 or 2, and the UE 115-*b* may be an example of aspects of the UE 115 described with reference to FIG. 1 or 2. The network access device 105-*e* may be, for example, an eNB, an ANC, a radio head, or a base station.

The network access device 105-*e* may transmit a plurality of reference signals 605 over a plurality of channels to the UE 115-*b*. Each channel of the plurality of channels may correspond to a pairing of a transmit antenna of the network access device 105-*e* with a receive antenna of the UE 115-*b*. Each channel response of the plurality of channel responses may correspond to a plurality of tone subsets. In some examples, the plurality of tone subsets may include single tone subsets. In some examples, the plurality of tone subsets may include tone bundles.

At 610, the UE 115-*b* may measure the reference signals and identify a plurality of channel responses based at least in part on the measurements of the plurality of reference signals.

At 615, the UE 115-*b* may select, for each channel of the plurality of channels, a subset of non-frequency domain components (e.g., one or more paths or multipaths) of the channel response for the channel. In some examples, a non-frequency domain component of a channel response for a channel may be identified by a location, a phase, an amplitude, or a combination thereof. In some examples, a non-frequency domain component of a channel response may be a time domain component.

The UE 115-*b* may transmit, for at least one channel of the plurality of channels, at least one subset of CSI. The at least one subset of CSI may be based at least in part on at least one of the subsets of non-frequency domain components selected at 615. The at least one subset of CSI may be transmitted to the network access device 105-*e*. In some examples, transmitting the at least one subset of CSI may include transmitting a first subset of CSI 620 for at least a first channel during a first subframe, and transmitting a second subset of CSI 625 for at least a second channel during a second subframe (e.g., subsets of CSI may be transmitted sequentially). In some examples, transmitting the at least one subset of CSI may include transmitting a first subset of CSI 620 for at least a first channel during the first subframe, and transmitting a supplement 630 to the first subset of CSI for at least the first channel during the second subframe (e.g., a subset of CSI may be transmitted incrementally). In either set of examples, the second subframe may be transmitted later in time than the first subframe. Depending on the capacities of the first and second subframes, other subsets of CSI or supplements to previously transmitted subsets of CSI may also be transmitted in the first or second subframe.

In some examples of the communication flow 600, the first subset of CSI 620 transmitted during the first subframe may include at least a first location, a first phase, a first amplitude, or a combination thereof identifying a first non-frequency domain component of the first channel. In these examples, a supplement 630 to the first subset of CSI transmitted during the second subframe may include at least a second location, a second phase, a second amplitude, or a combination thereof identifying a second non-frequency domain component of the first channel. Alternatively, a supplement 630 to the first subset of CSI transmitted during the second subframe may include at least a second location relative to the first location, a second phase relative to the first phase, a second amplitude relative to the first amplitude, or a combination thereof identifying a second non-frequency domain component of the first channel.

At 630, the network access device 105-*e* may use the received CSI to identify channel estimates for the plurality of channels, to configure precoders for the channels, etc.

Figure 7:
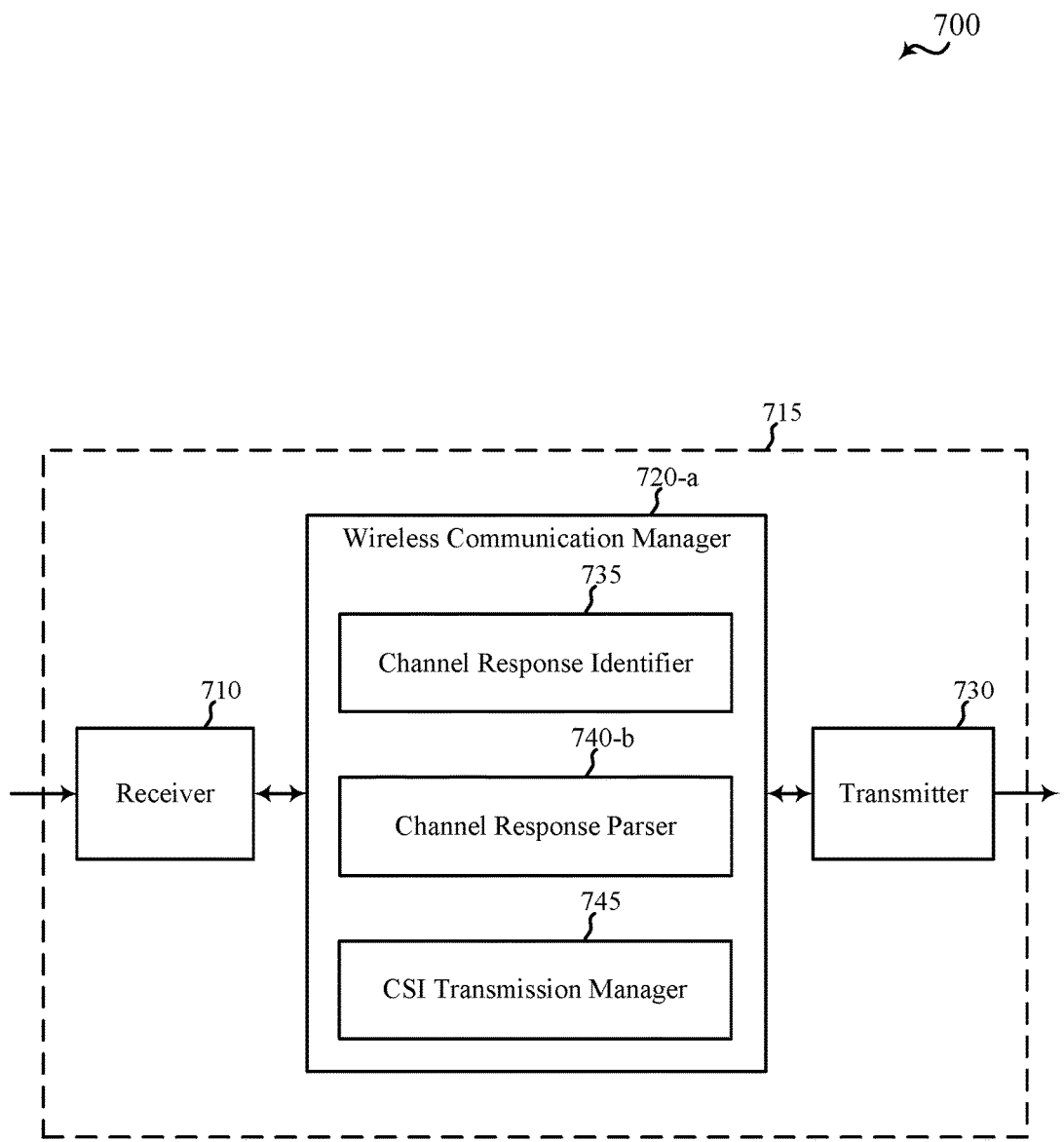
FIG. 7 shows a block diagram of an apparatus for use in wireless communication, in accordance with various aspects of the present disclosure.

FIG. 7 shows a block diagram 700 of an apparatus 715 for use in wireless communication, in accordance with various aspects of the present disclosure. The apparatus 715 may be an example of aspects of one or more of the UEs 115 described with reference to FIG. 1, 2, or 6. The apparatus 715 may also be or include a processor. The apparatus 715 may include a receiver 710, a wireless communication manager 720-*a*, or a transmitter 730. Each of these components may be in communication with each other.

The components of the apparatus 715 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one radio frequency (RF) receiver, such as at least one RF receiver operable to receive transmissions over one or more radio frequency spectrum bands. In some examples, the receiver 710 may include an array of receive antennas. In some examples, the one or more radio frequency spectrum bands may be used for LTE/LTE-A or 5G communications, as described, for example, with reference to FIG. 1, 2, 3, 4A, 4B, 4C, 5, 6, 7, or 8. The receiver 710 may be used to receive various types of data or control signals (i.e., transmissions) over one or more communication links (or channels) of a wireless communication system, such as one or more communication links (or channels) of the wireless communication system 100, 200, or 600 described with reference to FIG. 1, 2, or 6. In some examples, the receiver 710 may also or alternatively include one or more wired receivers.

In some examples, the transmitter 730 may include at least one RF transmitter, such as at least one RF transmitter operable to transmit over one or more radio frequency spectrum bands. In some examples, the transmitter 730 may include an array of transmit antennas. In some examples, the one or more radio frequency spectrum bands may be used for LTE/LTE-A or 5G communications, as described, for example, with reference to FIG. 1, 2, 3, 4A, 4B, 4C, 5, 6, 7, or 8. The transmitter 730 may be used to transmit various types of data or control signals (i.e., transmissions) over one or more communication links (or channels) of a wireless communication system, such as one or more communication links (or channels) of the wireless communication system 100, 200, or 600 described with reference to FIG. 1, 2, or 6. In some examples, the transmitter 730 may also or alternatively include one or more wired transmitters.

In some examples, the wireless communication manager 720-*a* may be used to manage one or more aspects of wireless communication for the apparatus 715. In some examples, part of the wireless communication manager 720-*a* may be incorporated into or shared with the receiver 710 or the transmitter 730. In some examples, the wireless communication manager 720-*a* may be an example of aspects of the wireless communication manager 720 described with reference to FIG. 1. In some examples, the wireless communication manager 720-*a* may include a channel response identifier 735, a channel response parser 740-*b*, or a CSI transmission manager 745.

The channel response identifier 735 may be used to identify a plurality of channel responses corresponding to a plurality of channels. Each channel of the plurality of channels may correspond to a pairing of a transmit antenna (of a network access device) with a receive antenna (of the apparatus 715). Each channel response of the plurality of channel responses may correspond to a plurality of tone subsets. In some examples, the plurality of tone subsets may include single tone subsets. In some examples, the plurality of tone subsets may include tone bundles. In some examples, the channel response identifier 735 may receive a plurality of reference signals over the plurality of channels, measure the plurality of reference signals, and identify the plurality of channel responses based at least in part on measurements of the plurality of reference signals.

The channel response parser 740-*b* may be used to select, for each channel of the plurality of channels, a subset of non-frequency domain components (e.g., one or more paths or multipaths) of the channel response for the channel. In some examples, a non-frequency domain component of a channel response for a channel may be identified by a location, a phase, an amplitude, or a combination thereof.

In some examples, the channel response parser 740-b may transform each channel response of the plurality of channel responses from a frequency domain to a time domain, and select a subset of non-frequency domain components of a channel response for a channel by selecting a subset of time domain components of the channel response. In some examples, the channel response parser 740-b may transform each channel response of the plurality of channel responses from the frequency domain to the time domain, determine an average of the channel responses in the time domain, and select a subset of non-frequency domain components of a channel response for a channel by selecting a subset of time domain components from the average of the channel response. In either set of examples, the subset of time domain components of a channel response for a channel may be selected based at least in part on a sparseness restriction, a fixed number of time domain components, a normalized power threshold, a relative distance between time domain components, a persistence of a time domain component across more than one subframe, a presence of a time domain component in a group of channel responses corresponding to a particular combination of tone and receive antenna, a delay spread compression target, a beamforming gain target, or a combination thereof.

The CSI transmission manager 745 may be used to transmit, for at least one channel of the plurality of channels, at least one subset of CSI. The at least one subset of CSI may be based at least in part on at least one of the selected subsets of non-frequency domain components. In some examples, the at least one subset of CSI may consist of a single subset of CSI, which single subset of CSI is associated with each channel of the plurality of channels. In some examples, the at least one subset of CSI may include different subsets of CSI associated with the same or different channels. The at least one subset of CSI may be transmitted to a network access device.

Figure 8:
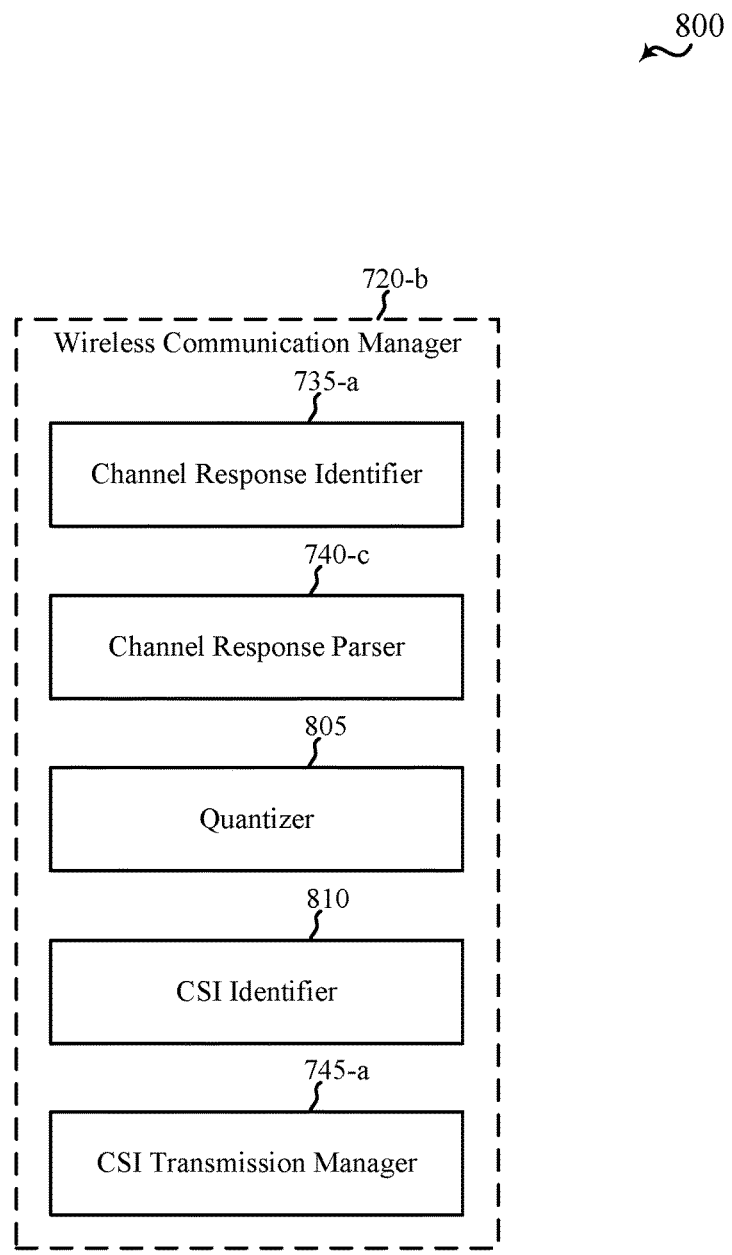
FIG. 8 shows a block diagram of a wireless communication manager for use in wireless communication, in accordance with various aspects of the present disclosure.

FIG. 8 shows a block diagram 800 of a wireless communication manager 720-b for use in wireless communication, in accordance with various aspects of the present disclosure. The wireless communication manager 720-b may be an example of aspects of the wireless communication manager 720 described with reference to FIG. 1 or 7.

The components of the wireless communication manager 720-b may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 720-b may be used to manage one or more aspects of wireless communication for a UE or apparatus, such as one of the UEs 115 described with reference to FIG. 1, 2, or 6, or one of the apparatuses 715 described with reference to FIG. 7. In some examples, part of the wireless communication manager 720-b may be incorporated into or shared with a receiver or a transmitter (e.g., the receiver 710 or the transmitter 730 described with reference to FIG. 7). In some examples, the wireless communication manager 720-b may include a channel response identifier 735-a, a channel response parser 740-c, a quantizer 805, a CSI identifier 810, or a CSI transmission manager 745-a.

The channel response identifier 735-a may be used to identify a plurality of channel responses corresponding to a plurality of channels. Each channel of the plurality of channels may correspond to a pairing of a transmit antenna (of a network access device) with a receive antenna (of a UE). Each channel response of the plurality of channel responses may correspond to a plurality of tone subsets. In some examples, the plurality of tone subsets may include single tone subsets. In some examples, the plurality of tone subsets may include tone bundles. In some examples, the channel response identifier 735-a may receive a plurality of reference signals over the plurality of channels, measure the plurality of reference signals, and identify the plurality of channel responses based at least in part on measurements of the plurality of reference signals.

The channel response parser 740-c may be used to select, for each channel of the plurality of channels, a subset of non-frequency domain components (e.g., one or more paths or multipaths) of the channel response for the channel. In some examples, a non-frequency domain component of a channel response for a channel may be identified by a location, a phase, an amplitude, or a combination thereof.

In some examples, the channel response parser 740-c may transform each channel response of the plurality of channel responses from a frequency domain to a time domain, and select a subset of non-frequency domain components of a channel response for a channel by selecting a subset of time domain components of the channel response. In some examples, the channel response parser 740-c may transform each channel response of the plurality of channel responses from the frequency domain to the time domain, determine an average of the channel responses in the time domain, and select a subset of non-frequency domain components of a channel response for a channel by selecting a subset of time domain components from the average of the channel response. In either set of examples, the subset of time domain components of a channel response for a channel may be selected based at least in part on a sparseness restriction, a fixed number of time domain components, a normalized power threshold, a relative distance between time domain components, a persistence of a time domain component across more than one subframe, a presence of a time domain component in a group of channel responses corresponding to a particular combination of tone and receive antenna, a delay spread compression target, a beamforming gain target, or a combination thereof.

The quantizer 805 may be used to quantize a location, a phase, an amplitude, or a combination thereof of a non-frequency domain component of a channel response for a channel. In some examples, a location or a phase corresponding to a non-frequency domain component of the channel response for a channel may be quantized with more bits than an amplitude corresponding to the non-frequency domain component of the channel response. In some examples, quantizing a location, a phase, an amplitude, or a combination thereof may include selecting at least one index into a codebook of quantized locations, quantized phases, or quantized amplitudes.

The CSI identifier 810 may be used to identify at least one subset of CSI for at least one channel of the plurality of channels. The at least one subset of CSI may be based at least in part on at least one of the subsets of non-frequency domain components selected by the channel response parser 740-c, and in some examples may be based at least in part on the quantized location, the quantized phase, the quantized amplitude, or the quantized combination thereof of at least one non-frequency domain component of at least one channel response. In some examples, the at least one subset of CSI may consist of a single subset of CSI, which single subset of CSI is associated with each channel of the plurality of channels. In some examples, the at least one subset of CSI may include different subsets of CSI associated with the same or different channels.

The CSI transmission manager 745-a may be used to transmit, for the at least one channel of the plurality of channels, at least one subset of CSI. In some examples, transmitting the at least one subset of CSI may include transmitting at least one selected index into a codebook. The at least one subset of CSI may be transmitted to a network access device.

In some examples, the CSI transmission manager 745-a may transmit the at least one subset of CSI by transmitting a first subset of CSI for at least a first channel during a first subframe, and transmitting a second subset of CSI for at least a second channel during a second subframe. In some examples, the CSI transmission manager 745-a may transmit the at least one subset of CSI by transmitting a first subset of CSI for at least a first channel during the first subframe, and transmitting a supplement to the first subset of CSI for at least the first channel during the second subframe. In either set of examples, the second subframe may be transmitted later in time than the first subframe. Depending on the capacities of the first and second subframes, other subsets of CSI or supplements to previously transmitted subsets of CSI may also be transmitted in the first or second subframe.

In some examples of the wireless communication manager 720-b, the first subset of CSI transmitted during the first subframe may include at least a first location, a first phase, a first amplitude, or a combination thereof identifying a first non-frequency domain component of the first channel. In these examples, the supplement to the first subset of CSI transmitted during the second subframe may include at least a second location, a second phase, a second amplitude, or a combination thereof identifying a second non-frequency domain component of the first channel. Alternatively, the supplement to the first subset of CSI transmitted during the second subframe may include at least a second location relative to the first location, a second phase relative to the first phase, a second amplitude relative to the first amplitude, or a combination thereof identifying a second non-frequency domain component of the first channel.

Figure 9:
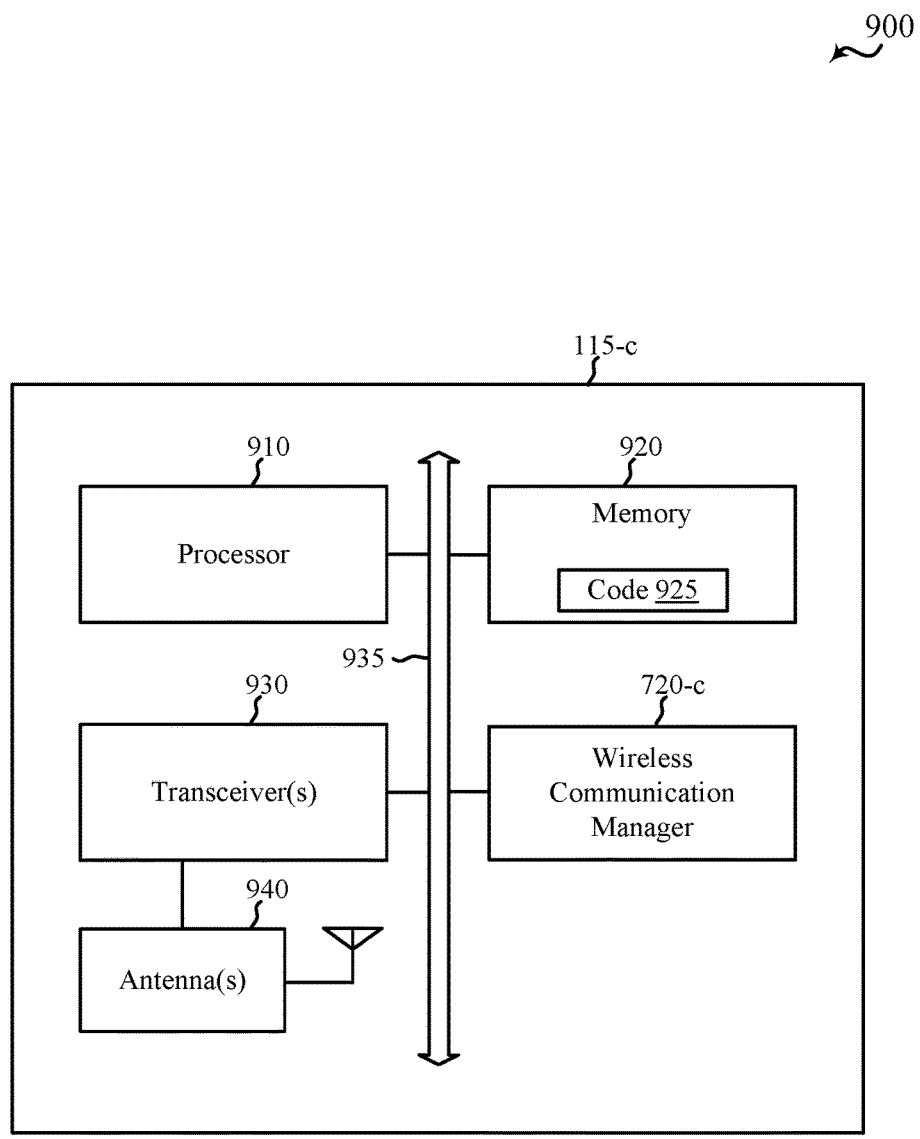
FIG. 9 shows a block diagram of a UE for use in wireless communication, in accordance with various aspects of the present disclosure.

FIG. 9 shows a block diagram 900 of a UE 115-c for use in wireless communication, in accordance with various aspects of the present disclosure. The UE 115-c may be included or be part of a personal computer (e.g., a laptop computer, a netbook computer, a tablet computer, etc.), a cellular telephone, a PDA, a DVR, an internet appliance, a gaming console, an e-reader, a vehicle, a home appliance, a lighting or alarm control system, etc. The UE 115-c may, in some examples, have an internal power supply (not shown), such as a small battery, to facilitate mobile operation. In some examples, the UE 115-c may be an example of aspects of one or more of the UEs 115 described with reference to FIG. 1, 2, or 6, or aspects of the apparatus 715 described with reference to FIG. 7. The UE 115-c may be configured to implement at least some of the UE or apparatus techniques and functions described with reference to FIG. 1, 2, 3, 4A, 4B, 5, 6, 7, or 8.

The UE 115-c may include a processor 910, a memory 920, at least one transceiver (represented by transceiver(s) 930), at least one antenna (represented by antenna(s) 940), or a wireless communication manager 720-c. Each of these components may be in communication with each other, directly or indirectly, over one or more buses 935.

The memory 920 may include random access memory (RAM) or read-only memory (ROM). The memory 920 may store computer-readable, computer-executable code 925 containing instructions that are configured to, when executed, cause the processor 910 to perform various functions described herein related to wireless communication, including, for example, at least some of the UE techniques and functions described with reference to FIG. 1, 2, 3, 4A, 4B, 5, 6, 7, or 8. Alternatively, the computer-executable code 925 may not be directly executable by the processor 910 but be configured to cause the UE 115-c (e.g., when compiled and executed) to perform various of the functions described herein.

The processor 910 may include an intelligent hardware device, e.g., a central processing unit (CPU), a microcontroller, an ASIC, etc. The processor 910 may process information received through the transceiver(s) 930 or information to be sent to the transceiver(s) 930 for transmission through the antenna(s) 940. The processor 910 may handle, alone or in connection with the wireless communication manager 720-c, various aspects of communicating over (or managing communications over) one or more radio frequency spectrum bands.

The transceiver(s) 930 may include a modem configured to modulate packets and provide the modulated packets to the antenna(s) 940 for transmission, and to demodulate packets received from the antenna(s) 940. The transceiver(s) 930 may, in some examples, be implemented as one or more transmitters and one or more separate receivers. The transceiver(s) 930 may support communications in one or more radio frequency spectrum bands. The transceiver(s) 930 may be configured to communicate bi-directionally, via the antenna(s) 940, with one or more of the network access devices 105 described with reference to FIG. 1, 2, or 6. While the UE 115-c may include a single antenna, there may be examples in which the UE 115-c may include multiple antennas 940.

The wireless communication manager 720-c may be configured to perform or control some or all of the UE or apparatus techniques or functions described with reference to FIG. 1, 2, 3, 4A, 4B, 5, 6, 7, or 8 related to wireless communication over one or more radio frequency spectrum bands. The wireless communication manager 720-c, or portions of it, may include a processor, or some or all of the functions of the wireless communication manager 720-c may be performed by the processor 910 or in connection with the processor 910. In some examples, the wireless communication manager 720-c may be an example of the wireless communication manager 720 described with reference to FIG. 1, 7, or 8.

Figure 10:
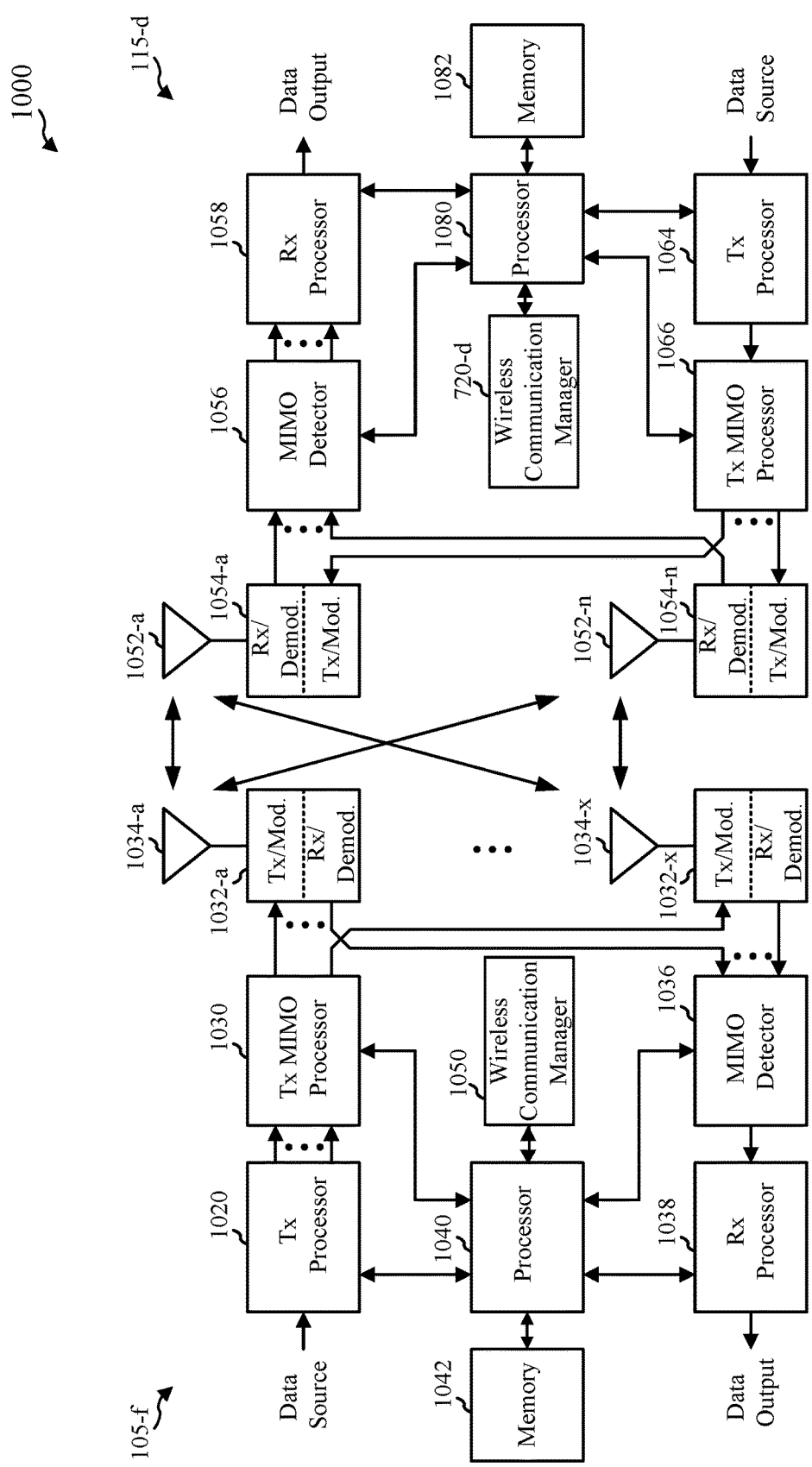
FIG. 10 is a block diagram of a MIMO communication system, in accordance with various aspects of the present disclosure.

FIG. 10 is a block diagram of a MIMO communication system 1000, in accordance with various aspects of the present disclosure. The MIMO communication system 1000 may include a network access device 105-f and a UE 115-d. The MIMO communication system 1000 may illustrate aspects of the wireless communication system 100 or 200 shown in FIG. 1 or 2. In some examples, the network access device 105-f may be an example of one or more aspects of a network access device (e.g., an eNB, an ANC, a radio head, or a base station), such as one of the network access devices 105 described with reference to FIG. 1 or 2, or aspects of the apparatus 905 described with reference to FIG. 9. The network access device 105-f may be equipped with antennas 1034-a through 1034-x, and the UE 115-d may be equipped with antennas 1052-a through 1052-n. In the MIMO communication system 1000, the network access device 105-f may be able to send data over multiple communication links at the same time. Each communication link may be called a "layer" and the "rank" of the communication link may indicate the number of layers used for communication. For example, in a 2×2 MIMO communications system where network access device 105-f transmits two "layers," the rank of the communication link between the network access device 105-f and the UE 115-d is two.

At the network access device 105-f, a transmit processor 1020 may receive data from a data source. The transmit processor 1020 may process the data. The transmit processor 1020 may also generate control symbols and/or reference symbols. A transmit (Tx) MIMO processor 1030 may perform spatial processing (e.g., precoding) on data symbols, control symbols, and/or reference symbols, if applicable, and may provide output symbol streams to the transmit modulator/demodulators 1032-a through 1032-x. Each modulator/demodulator 1032 may process a respective output symbol stream (e.g., for OFDM, etc.) to obtain an output sample stream. Each modulator/demodulator 1032 may further process (e.g., convert to analog, amplify, filter, and upconvert) the output sample stream to obtain a DL signal. In one example, DL signals from modulator/demodulators 1032-a through 1032-x may be transmitted via the antennas 1034-a through 1034-x, respectively.

At the UE 115-d, the antennas 1052-a through 1052-n may receive the DL signals from the network access device 105-f and may provide the received signals to the modulator/demodulators 1054-a through 1054-n, respectively. Each modulator/demodulator 1054 may condition (e.g., filter, amplify, downconvert, and digitize) a respective received signal to obtain input samples. Each modulator/demodulator 1054 may further process the input samples (e.g., for OFDM, etc.) to obtain received symbols. A MIMO detector 1056 may obtain received symbols from all the modulator/demodulators 1054-a through 1054-n, perform MIMO detection on the received symbols, if applicable, and provide detected symbols. A receive processor 1058 may process (e.g., demodulate, deinterleave, and decode) the detected symbols, providing decoded data for the UE 115-d to a data output, and provide decoded control information to a processor 1080, or memory 1082.

The processor 1080 may in some cases execute stored instructions to instantiate a wireless communication manager 1050. The wireless communication manager 1050 may be used, for example, to transmit a plurality of reference signals over a plurality of channels corresponding to pairings between the antennas 1034-a through 1034-x and the antennas 1052-a through 1052-n. The wireless communication manager 1050 may also or alternatively be used, for example, to receive and process CSI received for the plurality of channels.

On the uplink (UL), at the UE 115-d, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054-a through 1054-n (e.g., for SC-FDMA, etc.), and be transmitted to the network access device 105-f in accordance with the transmission parameters received from the network access device 105-f. At the network access device 105-f, the UL signals from the UE 115-d may be received by the antennas 1034, processed by the modulator/demodulators 1032, detected by a MIMO detector 1036 if applicable, and further processed by a receive processor 1038. The receive processor 1038 may provide decoded data to a data output and to the processor 1040 and/or memory 1042. The processor 1040 may in some cases execute stored instructions to instantiate a wireless communication manager 720-d. The wireless communication manager 720-d may be an example of aspects of the wireless communication manager 720 described with reference to FIG. 1, 7, 8, or 9.

The components of the UE 115-d may, individually or collectively, be implemented with one or more ASICs adapted to perform some or all of the applicable functions in hardware. Each of the noted modules may be a means for performing one or more functions related to operation of the MIMO communication system 1000. Similarly, the components of the network access device 105-f may, individually or collectively, be implemented with one or more ASICs adapted to perform some or all of the applicable functions in hardware. Each of the noted components may be a means for performing one or more functions related to operation of the MIMO communication system 1000.

Figure 11:
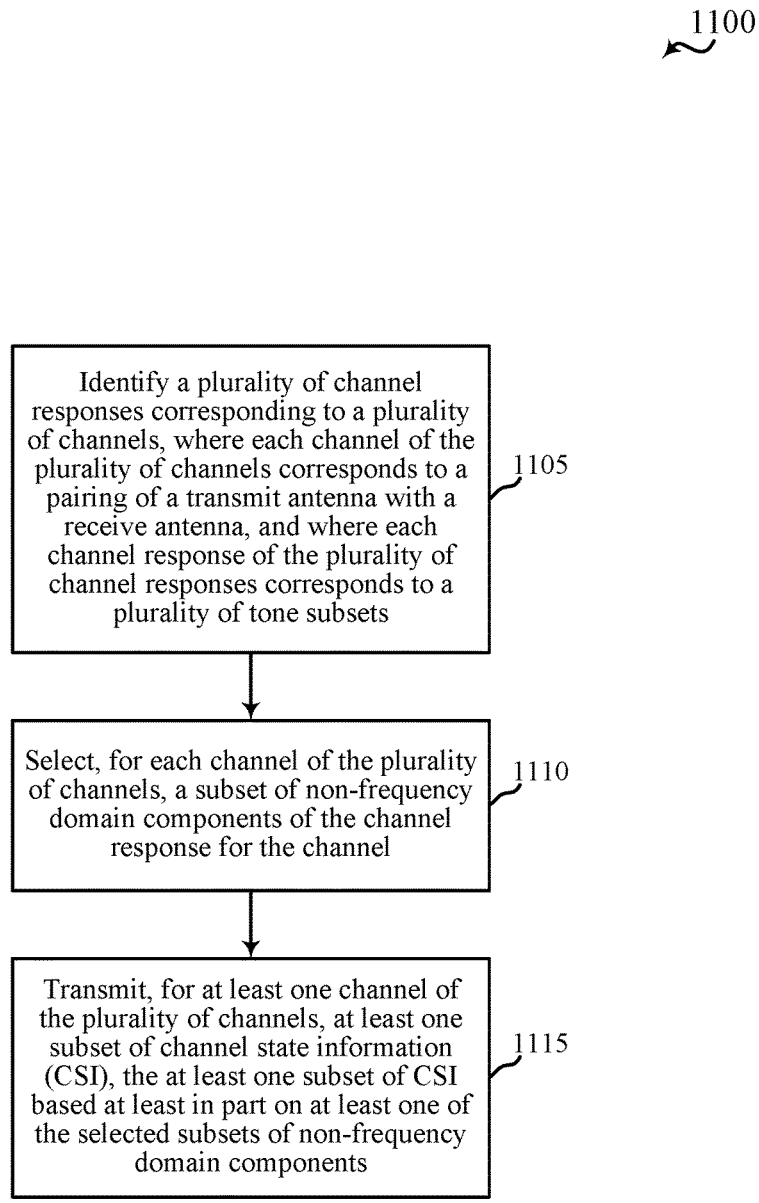
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the UEs 115 described with reference to FIG. 1, 2, 6, 9, or 10, or aspects of the apparatus 715 described with reference to FIG. 7, or aspects of the wireless communication manager 720 described with reference to FIG. 1, 7, 8, 9, or 10. In some examples, a UE may execute one or more sets of codes to control the functional elements of the UE to perform the functions described below. Additionally or alternatively, the UE may perform one or more of the functions described below using special-purpose hardware.

At block 1105, the method 1100 may include identifying a plurality of channel responses corresponding to a plurality of channels. Each channel of the plurality of channels may correspond to a pairing of a transmit antenna with a receive antenna. Each channel response of the plurality of channel responses may correspond to a plurality of tone subsets. In some examples, the plurality of tone subsets may include single tone subsets. In some examples, the plurality of tone subsets may include tone bundles. The operation(s) at block 1105 may be performed using the wireless communication manager 720 described with reference to FIG. 1, 7, 8, 9, or 10, or the channel response identifier 735 described with reference to FIG. 4A, 7, or 8. An example of the operation(s) performed at block 1105 is described with reference to FIG. 4A.

In some examples, the method 1100 may include receiving a plurality of reference signals over the plurality of channels, measuring the plurality of reference signals, and identifying the plurality of channel responses (at block 1105) based at least in part on the measurements of the plurality of reference signals.

At block 1110, the method 1100 may include selecting, for each channel of the plurality of channels, a subset of non-frequency domain components (e.g., one or more paths or multipaths) of the channel response for the channel. In some examples, a non-frequency domain component of a channel response for a channel may be identified by a location, a phase, an amplitude, or a combination thereof. The operation(s) at block 1110 may be performed using the wireless communication manager 720 described with reference to FIG. 1, 7, 8, 9, or 10, or the channel response parser 740 described with reference to FIG. 4B, 5, 7, or 8. An example of the operation(s) performed at block 1110 is described with reference to FIG. 4B or 5.

In some examples, the method 1100 may include transforming each channel response of the plurality of channel responses from a frequency domain to a time domain, and selecting a subset of non-frequency domain components of a channel response for a channel, at block 1110, by selecting a subset of time domain components of the channel response. In some examples, the method 1100 may include transforming each channel response of the plurality of channel responses from the frequency domain to the time domain, determining an average of the channel responses in the time domain, and selecting a subset of non-frequency domain components of a channel response for a channel, at block 1110, by selecting a subset of time domain components from the average of the channel response. In either set of examples, the subset of time domain components of a channel response for a channel may be selected based at least in part on a sparseness restriction, a fixed number of time domain components, a normalized power threshold, a relative distance between time domain components, a persistence of a time domain component across more than one subframe, a presence of a time domain component in a group of channel responses corresponding to a particular combination of tone and receive antenna, a delay spread compression target, a beamforming gain target, or a combination thereof.

At block 1115, the method 1100 may include transmitting, for at least one channel of the plurality of channels, at least one subset of CSI. The at least one subset of CSI may be based at least in part on at least one of the selected subsets of non-frequency domain components. In some examples, the at least one subset of CSI may consist of a single subset of CSI, which single subset of CSI is associated with each channel of the plurality of channels. In some examples, the at least one subset of CSI may include different subsets of CSI associated with the same or different channels. The at least one subset of CSI may be transmitted to a network access device. The operation(s) at block 1115 may be performed using the wireless communication manager 720 described with reference to FIG. 1, 7, 8, 9, or 10, or the CSI transmission manager 745 described with reference to FIG. 7 or 8.

Thus, the method 1100 may provide for wireless communication. It should be noted that the method 1100 is just one implementation and that the operations of the method 1100 may be rearranged or otherwise modified such that other implementations are possible.

Figure 12:
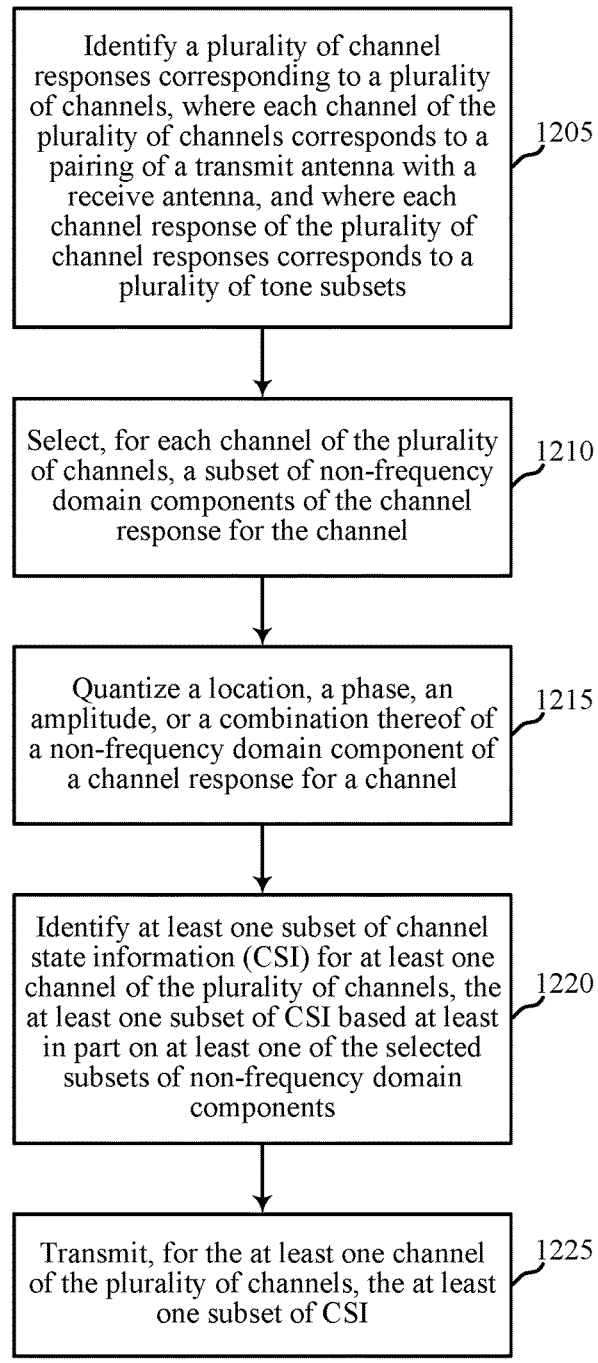
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the UEs 115 described with reference to FIG. 1, 2, 6, 9, or 10, or aspects of the apparatus 715 described with reference to FIG. 7, or aspects of the wireless communication manager 720 described with reference to FIG. 1, 7, 8, 9, or 10. In some examples, a UE may execute one or more sets of codes to control the functional elements of the UE to perform the functions described below. Additionally or alternatively, the UE may perform one or more of the functions described below using special-purpose hardware.

At block 1205, the method 1200 may include identifying a plurality of channel responses corresponding to a plurality of channels. Each channel of the plurality of channels may correspond to a pairing of a transmit antenna with a receive antenna. Each channel response of the plurality of channel responses may correspond to a plurality of tone subsets. In some examples, the plurality of tone subsets may include single tone subsets. In some examples, the plurality of tone subsets may include tone bundles. The operation(s) at block 1205 may be performed using the wireless communication manager 720 described with reference to FIG. 1, 7, 8, 9, or 10, or the channel response identifier 735 described with reference to FIG. 4A, 7, or 8. An example of the operation(s) performed at block 1205 is described with reference to FIG. 4A.

At block 1210, the method 1200 may include selecting, for each channel of the plurality of channels, a subset of non-frequency domain components (e.g., one or more paths or multipaths) of the channel response for the channel. In some examples, a non-frequency domain component of a channel response for a channel may be identified by a location, a phase, an amplitude, or a combination thereof. The operation(s) at block 1210 may be performed using the wireless communication manager 720 described with reference to FIG. 1, 7, 8, 9, or 10, or the channel response parser 740 described with reference to FIG. 4B, 5, 7, or 8. An example of the operation(s) performed at block 1210 is described with reference to FIG. 4B or 5.

At block 1215, the method 1200 may include quantizing a location, a phase, an amplitude, or a combination thereof of a non-frequency domain component of a channel response for a channel. In some examples, a location or a phase corresponding to a non-frequency domain component of the channel response for a channel may be quantized with more bits than an amplitude corresponding to the non-frequency domain component of the channel response. In some examples, quantizing a location, a phase, an amplitude, or a combination thereof may include selecting at least one index into a codebook of quantized locations, quantized phases, or quantized amplitudes. The operation(s) at block 1215 may be performed using the wireless communication manager 720 described with reference to FIG. 1, 7, 8, 9, or 10, or the quantizer 805 described with reference to FIG. 8.

At block 1220, the method 1200 may include identifying at least one subset of CSI for at least one channel of the plurality of channels. The at least one subset of CSI may be based at least in part on at least one of the subsets of non-frequency domain components selected at block 1210, and in some examples may be based at least in part on the quantized location, the quantized phase, the quantized amplitude, or the quantized combination thereof of at least one non-frequency domain component of at least one channel response. In some examples, the at least one subset of CSI may consist of a single subset of CSI, which single subset of CSI is associated with each channel of the plurality of channels. In some examples, the at least one subset of CSI may include different subsets of CSI associated with the same or different channels. The operation(s) at block 1220 may be performed using the wireless communication manager 720 described with reference to FIG. 1, 7, 8, 9, or 10, or the CSI identifier 810 described with reference to FIG. 8.

At block 1225, the method 1200 may include transmitting, for the at least one channel of the plurality of channels, the at least one subset of CSI. In some examples, transmitting the at least one subset of CSI may include transmitting at least one selected index into the codebook. The at least one subset of CSI may be transmitted to a network access device. The operation(s) at block 1225 may be performed using the wireless communication manager 720 described with reference to FIG. 1, 7, 8, 9, or 10, or the CSI transmission manager 745 described with reference to FIG. 7 or 8.

Thus, the method 1200 may provide for wireless communication. It should be noted that the method 1200 is just one implementation and that the operations of the method 1200 may be rearranged or otherwise modified such that other implementations are possible.

Figure 13:
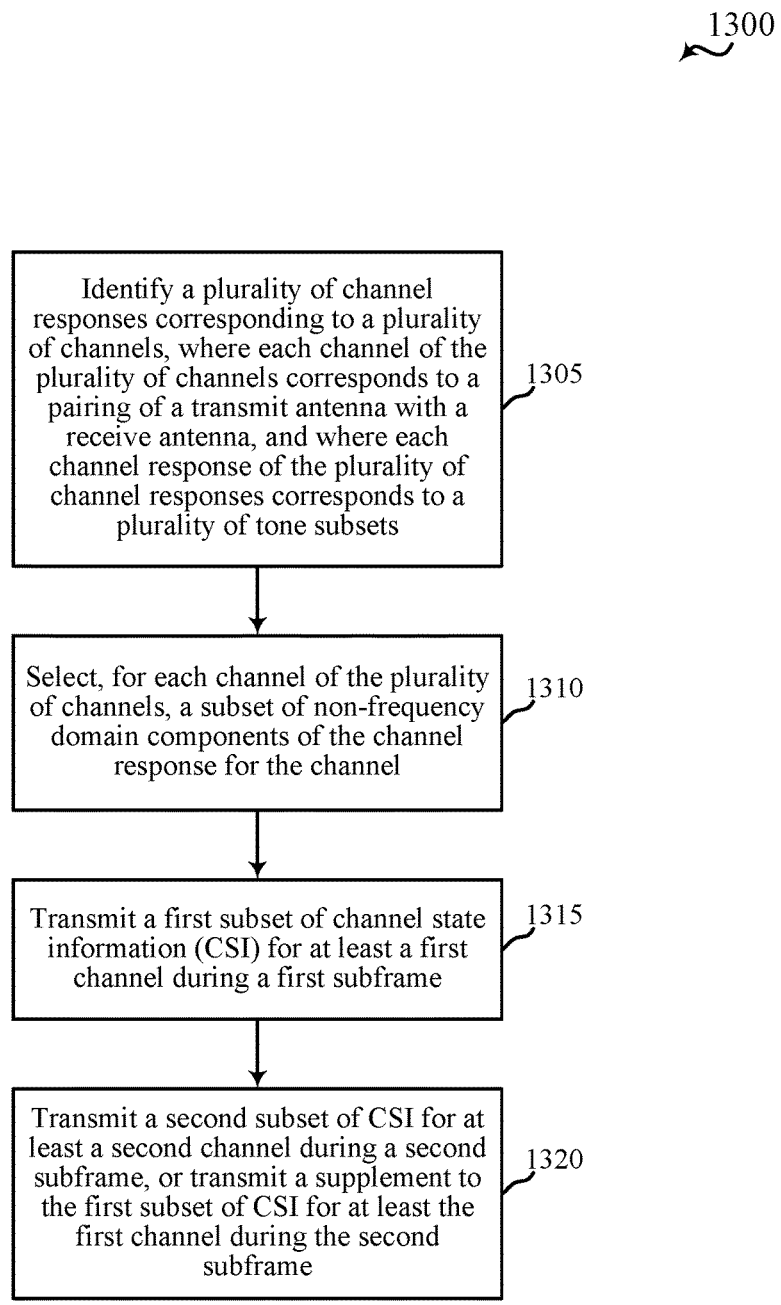
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the UEs 115 described with reference to FIG. 1, 2, 6, 9, or 10, or aspects of the apparatus 715 described with reference to FIG. 7, or aspects of the wireless communication manager 720 described with reference to FIG. 1, 7, 8, 9, or 10. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include identifying a plurality of channel responses corresponding to a plurality of channels. Each channel of the plurality of channels may correspond to a pairing of a transmit antenna with a receive antenna. Each channel response of the plurality of channel responses may correspond to a plurality of tone subsets. In some examples, the plurality of tone subsets may include single tone subsets. In some examples, the plurality of tone subsets may include tone bundles. The operation(s) at block 1305 may be performed using the wireless communication manager 720 described with reference to FIG. 1, 7, 8, 9, or 10, or the channel response identifier 735 described with reference to FIG. 4A, 7, or 8. An example of the operation(s) performed at block 1305 is described with reference to FIG. 4A.

At block 1310, the method 1300 may include selecting, for each channel of the plurality of channels, a subset of non-frequency domain components (e.g., one or more paths or multipaths) of the channel response for the channel. In some examples, a non-frequency domain component of a channel response for a channel may be identified by a location, a phase, an amplitude, or a combination thereof. The operation(s) at block 1310 may be performed using the wireless communication manager 720 described with reference to FIG. 1, 7, 8, 9, or 10, or the channel response parser 740 described with reference to FIG. 4B, 5, 7, or 8. An example of the operation(s) performed at block 1310 is described with reference to FIG. 4B or 5.

At blocks 1315 and 1320, the method 1300 may include transmitting, for at least one channel of the plurality of channels, at least one subset of CSI. The at least one subset of CSI may be based at least in part on at least one of the selected subsets of non-frequency domain components. The at least one subset of CSI may be transmitted to a network access device. In some examples, transmitting the at least one subset of CSI may include transmitting, at block 1315, a first subset of CSI for at least a first channel during a first subframe, and transmitting, at block 1320, a second subset of CSI for at least a second channel during a second subframe. In some examples, transmitting the at least one subset of CSI may include transmitting, at block 1315, a first subset of CSI for at least a first channel during the first subframe, and transmitting, at block 1320, a supplement to the first subset of CSI for at least the first channel during the second subframe. In either set of examples, the second subframe may be transmitted later in time than the first subframe. Depending on the capacities of the first and second subframes, other subsets of CSI or supplements to previously transmitted subsets of CSI may also be transmitted in the first or second subframe. The operations at blocks 1315 and 1320 may be performed using the wireless communication manager 720 described with reference to FIG. 1, 7, 8, 9, or 10, or the CSI transmission manager 745 described with reference to FIG. 7 or 8. An example of the operations performed at blocks 1315 and 1320 is described with reference to FIG. 6.

In some examples of the method 1300, the first subset of CSI transmitted during the first subframe may include at least a first location, a first phase, a first amplitude, or a combination thereof identifying a first non-frequency domain component of the first channel. In these examples, a supplement to the first subset of CSI transmitted during the second subframe may include at least a second location, a second phase, a second amplitude, or a combination thereof identifying a second non-frequency domain component of the first channel. Alternatively, a supplement to the first subset of CSI transmitted during the second subframe may include at least a second location relative to the first location, a second phase relative to the first phase, a second amplitude relative to the first amplitude, or a combination thereof identifying a second non-frequency domain component of the first channel.

Thus, the method 1300 may provide for wireless communication. It should be noted that the method 1300 is just one implementation and that the operations of the method 1300 may be rearranged or otherwise modified such that other implementations are possible.

In some examples, aspects of the methods 1100, 1200, or 1300 described with reference to FIG. 11, 12, or 13 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication, comprising:
   identifying a plurality of channel responses corresponding to a plurality of channels, wherein each channel of the plurality of channels corresponds to a pairing of a transmit antenna with a receive antenna, and wherein each channel response of the plurality of channel responses corresponds to a plurality of tone subsets;
   transforming each channel response of the plurality of channel responses from a frequency domain to a time domain;
   selecting, for each channel of the plurality of channels, a subset of time domain components of the channel response for the channel, wherein the subset of time domain components is selected based at least in part on a persistence of a time domain component across more than one subframe; and
   transmitting, for at least one channel of the plurality of channels, at least one subset of channel state information (CSI), the at least one subset of CSI based at least in part on at least one of the selected subsets of time domain components.

2. The method of claim 1, further comprising:
   determining an average of the channel responses in the time domain;
   wherein selecting the subset of time domain components of a channel response for a channel comprises selecting the subset of time domain components from the average of the channel responses.

3. The method of claim 1, further comprising:
receiving a plurality of reference signals over the plurality of channels; and
measuring the plurality of reference signals;
wherein the plurality of channel responses is identified based at least in part on measurements of the plurality of reference signals.

4. The method of claim 1, wherein the time domain component of a channel response for a channel is identified by a location, a phase, an amplitude, or a combination thereof, the method further comprising:
quantizing the location, the phase, the amplitude, or a combination thereof; and
identifying the at least one subset of CSI for the at least one channel based at least in part on the quantized location, the quantized phase, the quantized amplitude, or the quantized combination thereof.

5. The method of claim 4, wherein a location or a phase corresponding to a time domain component of a channel response for a channel is quantized with more bits than an amplitude corresponding to the time domain component of the channel response.

6. The method of claim 4, wherein quantizing the location, the phase, the amplitude, or the combination thereof comprises:
selecting at least one index into a codebook of quantized locations, quantized phases, or quantized amplitudes;
wherein transmitting the at least one subset of CSI for the at least one channel comprises transmitting the at least one selected index into the codebook.

7. The method of claim 1, wherein transmitting the at least one subset of CSI for the at least one channel of the plurality of channels comprises:
transmitting a single subset of CSI, wherein the single subset of CSI is associated with each channel of the plurality of channels.

8. The method of claim 1, wherein the tone subsets are from a group consisting of:
single tone subsets and tone bundles.

9. A method for wireless communication, comprising:
identifying a plurality of channel responses corresponding to a plurality of channels, wherein each channel of the plurality of channels corresponds to a pairing of a transmit antenna with a receive antenna, and wherein each channel response of the plurality of channel responses corresponds to a plurality of tone subsets;
selecting, for each channel of the plurality of channels, a subset of time domain components of the channel response for the channel; and
transmitting, for at least one channel of the plurality of channels, at least one subset of channel state information (CSI), the at least one subset of CSI based at least in part on at least one of the selected subsets of time domain components, wherein transmitting the at least one subset of CSI for the at least one channel of the plurality of channels comprises:
transmitting a first subset of CSI for at least a first channel during a first subframe; and
transmitting a second subset of CSI for at least a second channel or a supplement to the first subset of CSI for at least the first channel during a second subframe.

10. The method of claim 9, wherein the second subframe is transmitted later in time than the first subframe.

11. The method of claim 10, wherein the first subset of CSI transmitted during the first subframe comprises at least a first location, a first phase, a first amplitude, or a combination thereof identifying a first time domain component of the first channel.

12. The method of claim 11, wherein the supplement to the first subset of CSI transmitted during the second subframe comprises at least a second location, a second phase, a second amplitude, or a combination thereof identifying a second time domain component of the first channel.

13. The method of claim 11, wherein the supplement to the first subset of CSI transmitted during the second subframe comprises at least a second location relative to the first location, a second phase relative to the first phase, a second amplitude relative to the first amplitude, or a combination thereof identifying a second time domain component of the first channel.

14. An apparatus for wireless communication, comprising:
means for identifying a plurality of channel responses corresponding to a plurality of channels, wherein each channel of the plurality of channels corresponds to a pairing of a transmit antenna with a receive antenna, and wherein each channel response of the plurality of channel responses corresponds to a plurality of tone subsets;
means for transforming each channel response of the plurality of channel responses from a frequency domain to a time domain;
means for selecting, for each channel of the plurality of channels, a subset of time domain components of the channel response for the channel, wherein the subset of time domain components is selected based at least in part on a persistence of a time domain component across more than one subframe; and
means for transmitting, for at least one channel of the plurality of channels, at least one subset of channel state information (CSI), the at least one subset of CSI based at least in part on at least one of the selected subsets of time domain components.

15. The apparatus of claim 14, further comprising:
means for determining an average of the channel responses in the time domain, wherein the means for selecting the subset of time domain components of a channel response for a channel comprises means for selecting a subset of time domain components from the average of the channel responses.

16. The apparatus of claim 14, further comprising:
means for receiving a plurality of reference signals over the plurality of channels; and
means for measuring the plurality of reference signals;
wherein the plurality of channel responses is identified based at least in part on measurements of the plurality of reference signals.

17. The apparatus of claim 14, wherein a time domain component of a channel response for a channel is identified by a location, a phase, an amplitude, or a combination thereof, the apparatus further comprising:
means for quantizing the location, the phase, the amplitude, or a combination thereof; and
means for identifying the at least one subset of CSI for the at least one channel based at least in part on the quantized location, the quantized phase, the quantized amplitude, or the quantized combination thereof.

18. An apparatus for wireless communication, comprising:
a channel response identifier to identify a plurality of channel responses corresponding to a plurality of channels, wherein each channel of the plurality of channels corresponds to a pairing of a transmit antenna with a receive antenna, and wherein each channel response of the plurality of channel responses corresponds to a plurality of tone subsets;

a channel response parser to transform each channel response of the plurality of channel responses from a frequency domain to a time domain and select, for each channel of the plurality of channels, a subset of time domain components of the channel response for the channel, wherein the subset of time domain components of a channel response for a channel is selected based at least in part on a persistence of a time domain component across more than one subframe; and a channel state information (CSI) transmission manager to transmit, for at least one channel of the plurality of channels, at least one subset of CSI, the at least one subset of CSI based at least in part on at least one of the selected subsets of time domain components.

19. The apparatus of claim 18, wherein the channel response parser determines an average of the channel responses in the time domain and selects the subset of time domain components of a channel response for a channel by selecting the subset of time domain components from the average of the channel responses.

20. The apparatus of claim 18, wherein a time domain component of a channel response for a channel is identified by a location, a phase, an amplitude, or a combination thereof, the apparatus further comprising:

a quantizer to quantize the location, the phase, the amplitude, or a combination thereof; and a CSI identifier to identify the at least one subset of CSI for the at least one channel based at least in part on the quantized location, the quantized phase, the quantized amplitude, or the quantized combination thereof.

21. The apparatus of claim 18, wherein transmitting the at least one subset of CSI for the at least one channel of the plurality of channels comprises:

transmitting a first subset of CSI for at least a first channel during a first subframe; and transmitting a second subset of CSI for at least a second channel during a second subframe.

22. The apparatus of claim 18, wherein transmitting the at least one subset of CSI for the at least one channel of the plurality of channels comprises:

transmitting a first subset of CSI for at least a first channel during a first subframe; and transmitting a supplement to the first subset of CSI for at least the first channel during a second subframe, the second subframe transmitted later in time than the first subframe.

23. The apparatus of claim 18, wherein transmitting the at least one subset of CSI for the at least one channel of the plurality of channels comprises:

transmitting a single subset of CSI, wherein the single subset of CSI is associated with each channel of the plurality of channels.

24. A non-transitory computer-readable medium storing computer-executable code for wireless communication, the code executable by a processor to:

identify a plurality of channel responses corresponding to a plurality of channels, wherein each channel of the plurality of channels corresponds to a pairing of a transmit antenna with a receive antenna, and wherein each channel response of the plurality of channel responses corresponds to a plurality of tone subsets;

transform each channel response of the plurality of channel responses from a frequency domain to a time domain;

select, for each channel of the plurality of channels, a subset of time domain components of the channel response for the channel, wherein the subset of time domain components is selected based at least in part on a persistence of a time domain component across more than one subframe; and transmit, for at least one channel of the plurality of channels, at least one subset of channel state information (CSI), the at least one subset of CSI based at least in part on at least one of the selected subsets of time domain components.

* * * * *